US010379209B2

(12) United States Patent
Kishigami et al.

(10) Patent No.: US 10,379,209 B2
(45) Date of Patent: Aug. 13, 2019

(54) RADAR DEVICE

(71) Applicant: Panasonic Intellectual Property Management Co., Ltd., Osaka (JP)

(72) Inventors: Takaaki Kishigami, Tokyo (JP); Tadashi Morita, Kanagawa (JP); Kiyotaka Kobayashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 725 days.

(21) Appl. No.: 14/846,680

(22) Filed: Sep. 4, 2015

(65) Prior Publication Data

US 2018/0074181 A1    Mar. 15, 2018

(30) Foreign Application Priority Data

Sep. 29, 2014  (JP) ................ 2014-198226

(51) Int. Cl.
*G01S 13/02* (2006.01)
*G01S 13/28* (2006.01)
*G01S 7/282* (2006.01)
*G01S 7/288* (2006.01)
*G01S 13/42* (2006.01)
(Continued)

(52) U.S. Cl.
CPC .......... *G01S 13/284* (2013.01); *G01S 7/282* (2013.01); *G01S 7/288* (2013.01); *G01S 13/0209* (2013.01); *G01S 13/282* (2013.01); *G01S 13/426* (2013.01); *G01S 13/524* (2013.01); *G01S 13/582* (2013.01); *G01S 13/931* (2013.01); *G01S 2007/2883* (2013.01); *G01S 2007/2886* (2013.01)

(58) Field of Classification Search
CPC .. G01S 13/0209; G01S 13/284; G01S 13/426; G01S 13/931; G01S 2007/2883; G01S 7/282; G01S 7/288
USPC ......................................................... 342/21
See application file for complete search history.

(56) References Cited

U.S. PATENT DOCUMENTS 5,923,290 A * 7/1999 Mikami ............... H01Q 3/22
342/374
6,246,357 B1   6/2001 Uehara
(Continued)

FOREIGN PATENT DOCUMENTS

EP   0 320 306 A2   6/1989
JP   2001-228243   8/2001
JP   2003-066140   3/2003

OTHER PUBLICATIONS

S. Z. Budisin "New complementary pairs of sequences" Electronics Letters. Jun. 1990, vol. 26, No. 13, pp. 881-883.
(Continued)

*Primary Examiner* — Timothy A Brainard
(74) *Attorney, Agent, or Firm* — Seed IP Law Group LLP

(57) ABSTRACT

A radar device includes: a transmission beam controller that selects, every first period, a transmission beam set used for transmission of a radar signal from among a plurality of transmission beam sets each including at least two transmission beam directions; and a radar transmitter that transmits the radar signal in a predetermined transmission period by using the selected transmission beam set, wherein the transmission beam controller switching, every second period within the first period, among the at least two transmission beam directions included in the transmission beam set.

20 Claims, 21 Drawing Sheets

(51) Int. Cl.
   *G01S 13/524*   (2006.01)
   *G01S 13/58*    (2006.01)
   *G01S 13/93*    (2006.01)

(56) References Cited

U.S. PATENT DOCUMENTS

| | | | |
|---|---|---|---|
| 7,142,584 B1 * | 11/2006 | Bomer | H04W 56/0085 375/145 |
| 2007/0189412 A1 * | 8/2007 | Xia | H04B 7/0619 375/292 |
| 2008/0150819 A1 * | 6/2008 | Uno | H01Q 3/24 343/770 |
| 2008/0266169 A1 | 10/2008 | Akita | |
| 2013/0148103 A1 * | 6/2013 | Halmos | G01S 17/102 356/5.09 |
| 2014/0062763 A1 | 3/2014 | Kishigami et al. | |

OTHER PUBLICATIONS

Extended European Search Report, dated Mar. 4, 2016, for corresponding EP Application No. 15183221.9-1812 / 3001218, 7 pages.

* cited by examiner

RADAR DEVICE

BACKGROUND

1. Technical Field

The present disclosure relates to a radar device.

2. Description of the Related Art

In recent years, studies have been conducted on a high-resolution radar device using a radar transmission signal having a short wavelength including a microwave or a millimeter wave. Furthermore, development of a radar device that detects objects (targets) including not only a vehicle but also a pedestrian in a wide-angle range is demanded in order to improve outdoor safety.

For example, as a radar device, a pulse radar device that repeatedly emits a pulse wave is known. A wide-angle pulse radar that detects a vehicle/pedestrian in a wide-angle range receives a signal that is a mixture of a plurality of reflected waves from a target existing at a short distance (e.g., a vehicle) and a target existing at a long distance (e.g., a pedestrian). Accordingly, (1) a radar transmitting section need be configured to transmit a pulse wave or a pulse-modulated wave having an autocorrelation characteristic of a low range sidelobe (hereinafter referred to as a low-range-sidelobe characteristic) and (2) a radar receiving section need be configured to have a wide reception dynamic range.

For example, a pulse-compression radar device using a Barker code, an M sequence code, a complementary code, or the like is known as a radar device using a pulse wave (or a pulse modulated wave) for obtaining a low-range-sidelobe characteristic. An example in which a complementary code is used is described below. A complementary code includes two code sequences (hereinafter referred to as complementary code sequences $a_n$ and $b_n$ where $n=1, \ldots, L$ (L is a code sequence length)). Autocorrelation computation of the two code sequences is expressed by the following expressions:

$$R_{aa}(\tau) = \sum_{n=1}^{L} a_n a_{n+\tau}^* \quad (1)$$

$$R_{bb}(\tau) = \sum_{n=1}^{L} b_n b_{n+\tau}^*$$

The two complementary codes $a_n$ and $b_n$ are transmitted in a time division manner as illustrated in FIG. 1. The complementary code has a property such that a range sidelobe becomes 0 when the results of autocorrelation computation of the two code sequences are added together while uniforming their shift times (delay times) as shown by the following expressions (see, for example, FIG. 2).

$$\begin{cases} R_{aa}(\tau) + R_{bb}(\tau) \neq 0, \text{ when } \tau = 0 \\ R_{aa}(\tau) + R_{bb}(\tau) = 0, \text{ when } \tau \neq 0 \end{cases} \quad (2)$$

where $a_n=0$ and $b_n=0$ when $n>L$ or $n<1$.

A method for generating a complementary code is disclosed in Budisin, S. Z., "New complementary pairs of sequences," Electron. Lett., 1990, 26, (13), pp. 881-883 (hereinafter referred to as Non-Patent Literature 1). According to Non-Patent Literature 1, for example, complementary codes having code sequence lengths L of 4, 8, 16, 32, ..., and $2^P$ can be sequentially generated on the basis of code sequences a=[1 1] and b=[1 −1] having complementarity including an element "1" or "−1". A dynamic range required for reception (required reception dynamic range) is wider as the code sequence length of a complementary code is longer. Meanwhile, a peak sidelobe ratio (PSR) is lower as the code sequence length of a complementary code is shorter. Accordingly, even in a case where a plurality of reflected waves from a target existing at a short distance and a target existing at a long distance are mixed, the required reception dynamic range can be reduced.

Meanwhile, in a case where an M sequence code is used instead of a complementary code, the peak sidelobe ratio is given by $20 \log(1/L)$ [dB]. Accordingly, in the case where an M sequence code is used, a code sequence length L (for example, L=1024 in a case where PSR=60 dB) that is longer than that in the case where a complementary code is used is needed in order to obtain a low range sidelobe.

Furthermore, a device that transmits a radar wave by mechanically or electronically scanning a directional beam is proposed as a wide-angle radar device that detects a target in a wide-angle range (see, for example, Japanese Unexamined Patent Application Publication No. 2001-228243 (hereinafter referred to as Patent Literature 1)). In Patent Literature 1, a radar device performs receiving processing while switching an antenna beam direction every predetermined antenna beam rotation stop period.

Furthermore, it is known that adding processing and Fourier transform processing are used in radar receiving processing of a pulse compression radar device in order to improve an SNR (Signal to Noise Ratio).

Specifically, in a case where a pulse compression code is repeatedly transmitted during pulse transmission periods Tr, a radar receiving section obtains an addition gain (coherent addition gain) by adding up (coherent integration) correlation values calculated in pulse compression processing. For example, by performing (for each of I and Q components of the correlation value) addition of correlation values calculated in the pulse compression processing Np times during pulse transmission periods with a high time correlation among the correlation values calculated hi the pulse compression processing, the SNR is improved by Np times due to coherent addition gain.

Furthermore, a radar receiving section obtains a coherent addition gain by detecting a peak frequency component on a Doppler spectrum (hereinafter referred to as a peak Doppler spectrum) by Fourier transform processing using Nc coherent addition results. For example, in a case where the Doppler spectrum can be approximated by a line spectrum, the SNR is improved by Nc times. Note that, for example, FFT (Fast Fourier Transform) or DFT (Discrete Fourier Transform) may be used as Fourier transform.

That is, the SNR is improved by (Np×Nc) times by performing addition processing and Fourier transform processing in the radar receiving section.

In the above conventional technique, for example, use of a radar device in which a radar transmitting section switches, every predetermined period, a transmission beam direction of a radar transmission signal by beam scanning as in Patent Literature 1 and a radar receiving section performs adding processing and Fourier transform processing is assumed. In such a radar device, radar receiving processing is performed for each transmission beam direction, and in a case where a target that moves at a high speed is to be detected, the radar device is required to shorten a beam scanning period. For example, one option is to reduce the number of additions in coherent integration processing and Fourier transform processing in the radar receiving processing.

Meanwhile, a radar device is required to have high resolution as described above. A Doppler frequency resolution Δfd and an observable maximum Doppler frequency fd_max are expressed by the following expressions:

$$\Delta fd = 1/(Np \times Nc \times Tr) \quad (3)$$

$$fd\_max = \pm 1/(2Np \times Tr) \quad (4)$$

where Np is the number of additions (also referred to as the number of coherent additions) in the adding processing (coherent integration processing) and Nc is the number of additions (also referred to as the number of Doppler additions) in the Fourier transform processing.

As shown by the expressions (3) and (4), when the number of coherent additions Np per transmission beam is decreased in order to shorten a beam scanning period, the Doppler frequency resolution Δfd decreases and the observable maximum Doppler frequency fd_max increases. Furthermore, when the number of Doppler additions Nc per transmission beam is decreased in order to shorten a beam scanning period, the Doppler frequency resolution Δfd decreases and the observable maximum Doppler frequency fd_max is maintained.

As described above, with the conventional technique, it is difficult to maintain Doppler frequency resolution and to shorten a beam scanning period.

SUMMARY

One non-limiting and exemplary embodiment provides a radar device that makes it possible to maintain Doppler frequency resolution and to shorten a beam scanning period.

In one general aspect, the techniques disclosed here feature a radar device including: a transmission beam controller that selects, every first period, a transmission beam set used for transmission of a radar signal from among a plurality of transmission beam sets each including at least two transmission beams having different directions; and a radar transmitter that transmits the radar signal in a predetermined transmission period by using the selected transmission beam set, the transmission beam controller switching, every second period within the first period, among the at least two transmission beam having different directions included in the selected transmission beam set.

According to one aspect of the present disclosure, it is possible to maintain Doppler frequency resolution and shorten a beam scanning period.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An embodiment according to one aspect of the present disclosure is described in detail below with reference to the drawings. In the embodiment below identical constituent elements are given identical reference signs and description thereof is omitted.

Configuration of Radar Device

Figure 3:
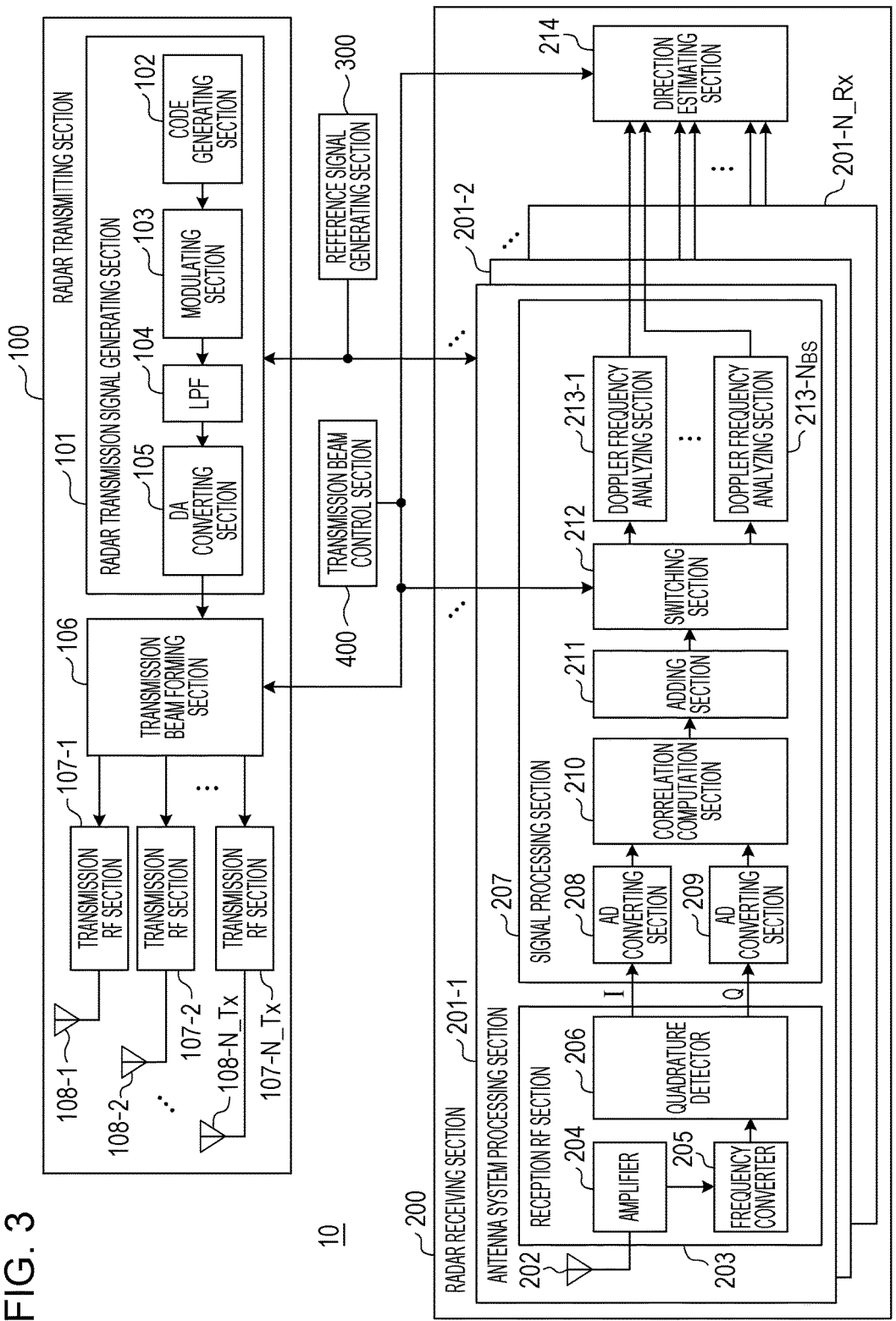
FIG. 3 is a block diagram illustrating a configuration of a radar device according to one embodiment of the present disclosure.

FIG. 3 is a block diagram illustrating a configuration of a radar device 10 according to the present embodiment.

The radar device 10 includes a radar transmitting section 100, a radar receiving section 200, a reference signal generating section 300, and a transmission beam control section 400.

The radar transmitting section 100 generates a high-frequency (radio-frequency) radar signal (radar transmission signal) on the basis of a reference signal received from the reference signal generating section 300. Then, the radar transmitting section 100 transmits the radar transmission signal in a predetermined transmission period while switching a transmission beam direction under control of the transmission beam control section 400.

The radar receiving section 200 receives, via an array antenna, reflected signals each of which is the radar transmission signal reflected by a target (not illustrated). The radar receiving section 200 performs detection of the presence or absence of a target, estimation of a direction of the target, or the like by performing signal processing on the reflected signals received via the antennas by using a reference signal received from the reference signal generating section 300. In the signal processing, the radar receiving section 200 performs coherent integration processing and Doppler frequency analyzing processing (including, for example, Fourier transform processing). The target is an object that is to be detected by the radar device 10 and encompasses, for example, a vehicle and a human.

The reference signal generating section 300 is connected to the radar transmitting section 100 and the radar receiving section 200. The reference signal generating section 300 supplies a common reference signal to the radar transmitting section 100 and the radar receiving section 200 so as to synchronize the processing in the radar transmitting section 100 and the processing in the radar receiving section 200.

The transmission beam control section 400 controls a main beam direction $\theta_{TX}$ of a transmission beam for transmission of the radar transmission signal. That is, the transmission beam control section 400 switches the direction of a transmission beam used for transmission of the radar transmission signal among a plurality of available transmission beam directions.

Specifically, the plurality of available transmission beam directions are grouped in a plurality of "transmission beam sets" each including at least two transmission beam directions. The number of transmission beam directions included in each transmission beam set is referred to as "the transmission beam set beam number" and is expressed by $N_{BS}$. The transmission beam control section 400 sequentially switches among the transmission beam directions included in the transmission beam set every predetermined first switching period T1. Furthermore, the transmission beam control section 400 sequentially switches among the transmission beam sets every predetermined second switching period T2, which is the integral multiple of the first switching period T1.

Then, the transmission beam control section 400 supplies a control signal indicating switching of the main beam direction to the radar transmitting section 100 (a transmission beam forming section 106 that will be described later) and the radar receiving section 200 (a switching section 212 and a direction estimating section 214 that will be described later). Note that details of the transmission beam control operation in the transmission beam control section 400 will be described later.

Configuration of Radar Transmitting Section 100

The radar transmitting section 100 includes a radar transmission signal generating section 101, the transmission beam forming section 106, a transmission RF (radio-frequency) sections 107-1 to 107-N_Tx, and transmission antennas 108-1 to 108-N_Tx. That is, the radar transmitting section 100 includes N_Tx transmission RF sections 107 and N_Tx transmission antennas 108.

The radar transmission signal generating section 101 generates a timing clock that is a predetermined multiple of a reference signal received from the reference signal generating section 300 and then generates a radar transmission signal on the basis of the generated timing clock. Then, the radar transmission signal generating section 101 repeatedly outputs the radar transmission signal every predetermined radar transmission period (Tr). The radar transmission signal is expressed by r(n, M)=I(k, M)+jQ(k, M) where j is an imaginary unit, k is a discrete time, and M is an ordinal number of a radar transmission period.

The radar transmission signal generating section 101 includes a code generating section 102, a modulating section 103, an LPF (Low Pass Filter) 104, and a DA converting section 105.

Specifically, the code generating section 102 generates a code a (n=1, . . . , L) (pulse compression code) of a code sequence having a code length L every radar transmission period Tr. Examples of the code sequence include an M sequence code, a Barker code sequence, and a complementary code sequence (including a Golay code sequence, a Spano code sequence, and the like).

Figure 1:
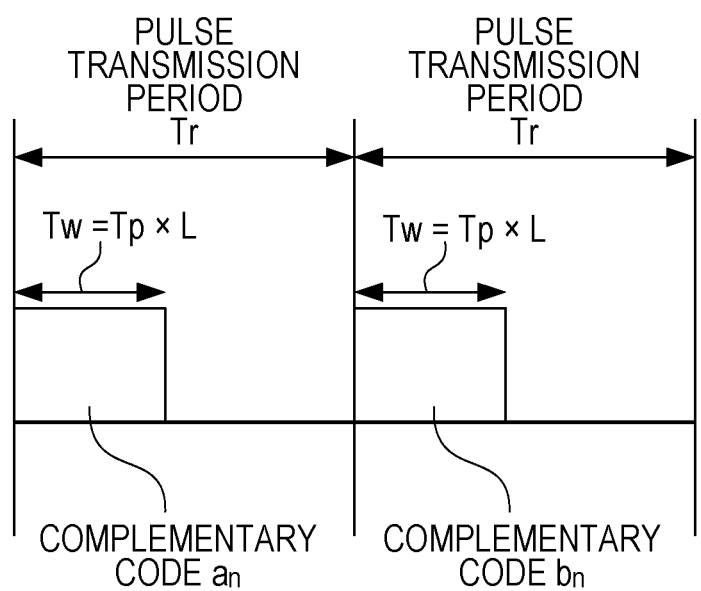
FIG. 1 is a diagram illustrating an example of a complementary code.
Figure 2:
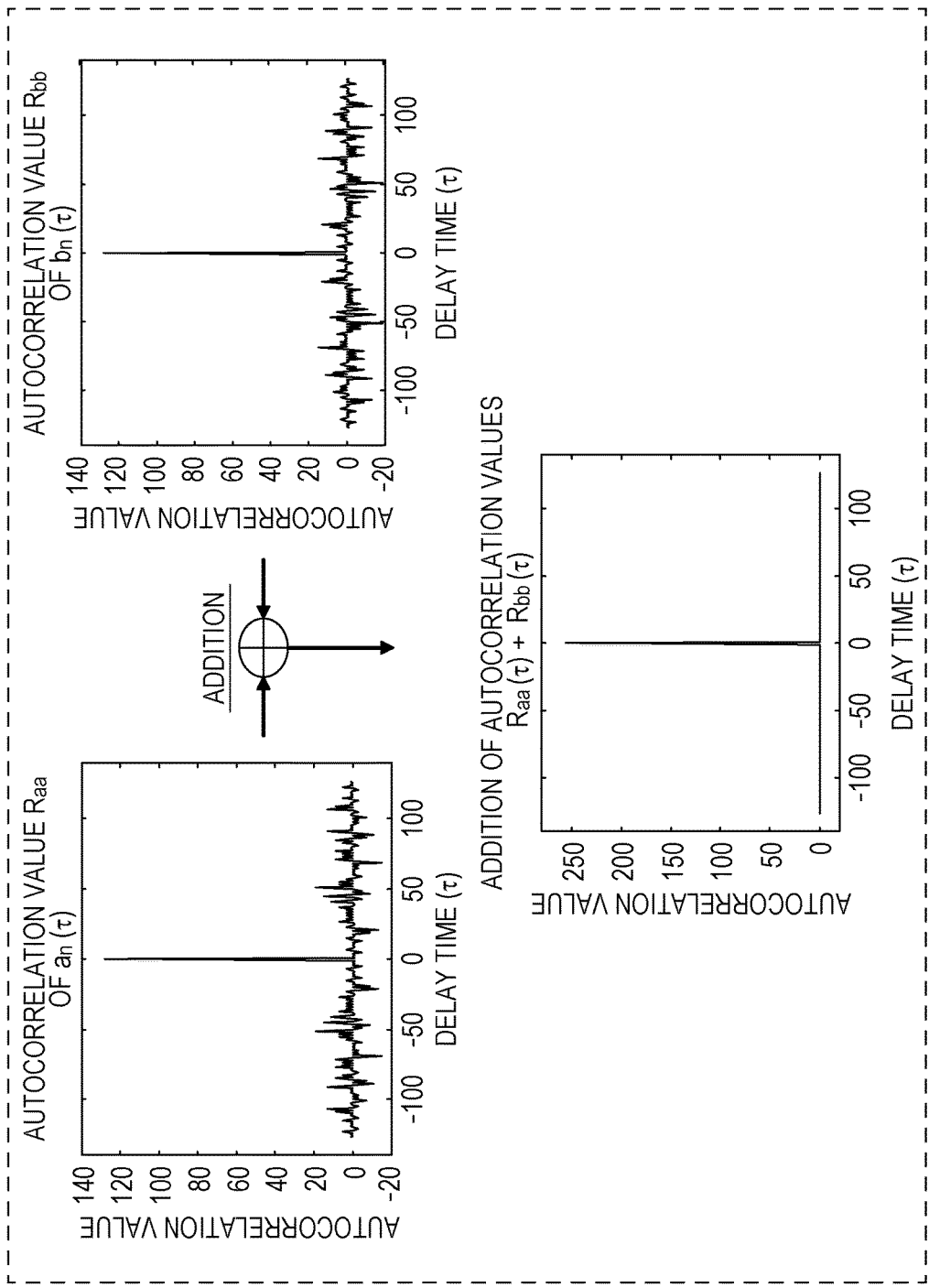
FIG. 2 is a diagram illustrating a range-sidelobe characteristic of a complementary code.

For example, in a case where a complementary code sequence is used as the code sequence, the code generating section 102 alternately generates a pair of codes Pn and Qn (corresponding to $a_n$ and $b_n$ in FIG. 1) every radar transmission period. That is, the code generating section 102 supplies the code Pn, which is one of the codes constituting the complementary code pair, to the modulating section 103 during an M-th radar transmission period (expressed by Tr[M]), and supplies the code Qn, which is the other one of the codes constituting the complementary code pair, to the modulating section 103 during a next (M+1)th radar transmission period (expressed by Tr[M+1]). Similarly, in an (M+2)th radar transmission period and subsequent radar transmission periods, the code generating section 102 repeatedly generates the codes Pn and Qn by using the two radar transmission periods (the M-th radar transmission period and the (M+1)th radar transmission period) as a single unit and then supplies the generated codes Pn and Qn to the modulating section 103.

The modulating section 103 performs pulse modulation (amplitude modulation, ASK (Amplitude Shift Keying), pulse shift keying) or phase modulation (Phase Shift Keying) on the code $a_n$ received from the code generating section 102 and then supplies the modulated signal to the LPF 104.

Of the modulated signal received from the modulating section 103, the LPF 104 supplies, as a baseband radar transmission signal, a signal component of a predetermined limited band or below to the DA converting section 105. Note that the LPF 104 may be disposed in a stage following the DA converting section 105 that will be described later.

The DA converting section 105 converts the digital transmission signal received from the LPF 104 into an analog transmission signal and then supplies the analog transmission signal to the transmission beam forming section 106.

The transmission beam forming section 106 forms a transmission beam in a main beam direction $\theta_{Tx(u)}$ for the baseband radar transmission signal received from the radar transmission signal generating section 101 in accordance with an instruction from the transmission beam control section 400. Specifically, the transmission beam forming section 106 multiplies the radar transmission signal by a weighting coefficient WTx (Index_Tx, $\theta_{TX(u)}$) so that a transmission beam direction $\theta_{TX(u)}$ designated by the transmission beam control section 400 is obtained in the N_Tx transmission RF sections 107 and the N_Tx transmission antennas 108 and then supplies the signal that has been multiplied by the weighting coefficient WTx (Index_Tx, $\theta_{TX(u)}$) to the transmission RF sections 107.

For example, in a case where the transmission antennas 108 are disposed in a straight line at equal intervals (element intervals d), the transmission beam forming section 106 corrects amplitude deviation and phase deviation among the transmission antennas 108 and then variably forms a transmission beam direction by using the weighting coefficient WTx (Index_Tx, $\theta_{Tx(u)}$) expressed by the following expression:

$$WTx(\text{Index\_Tx}, \theta_{TX(u)}) = \exp[j2\pi(\text{Index\_Tx}-1)d \sin \theta_{Tx(u)}/\lambda] \quad (5)$$

In the above expression, Index_Tx=1, ..., N_Tx, $\lambda$ is a wavelength of the radar transmission signal (transmission RF signal), and d is the element interval between the transmission antennas 108.

Note that in a case where the main beam is directed in the direction $\theta_{Tx(u)}$ and further the sidelobe level is reduced, the transmission beam forming section 106 may use a weighting coefficient (e.g., Dolph-Chebyshev beam weight, Talor beam weight) constituted by a phase component and an amplitude component.

An Index_Tx (=1, ..., N_Tx)th transmission RF section 107 performs frequency conversion on the transmission signal that has been multiplied by the weighting coefficient WTx (Index_Tx, $\theta_{Tx(u)}$) so as to generate a radar transmission signal of a carrier frequency (Radio Frequency: RF) band, amplifies the radar transmission signal to predetermined transmission electric power P [dB] by using a transmission amplifier, and then supplies the amplified radar transmission signal to the transmission antenna 108.

An Index_Tx (=1, ..., N_Tx)th transmission antenna 108 radiates, into a space, the radar transmission signal received from the Index_Tx (=1, ..., N_Tx)th transmission RF section 107.

Figure 4:
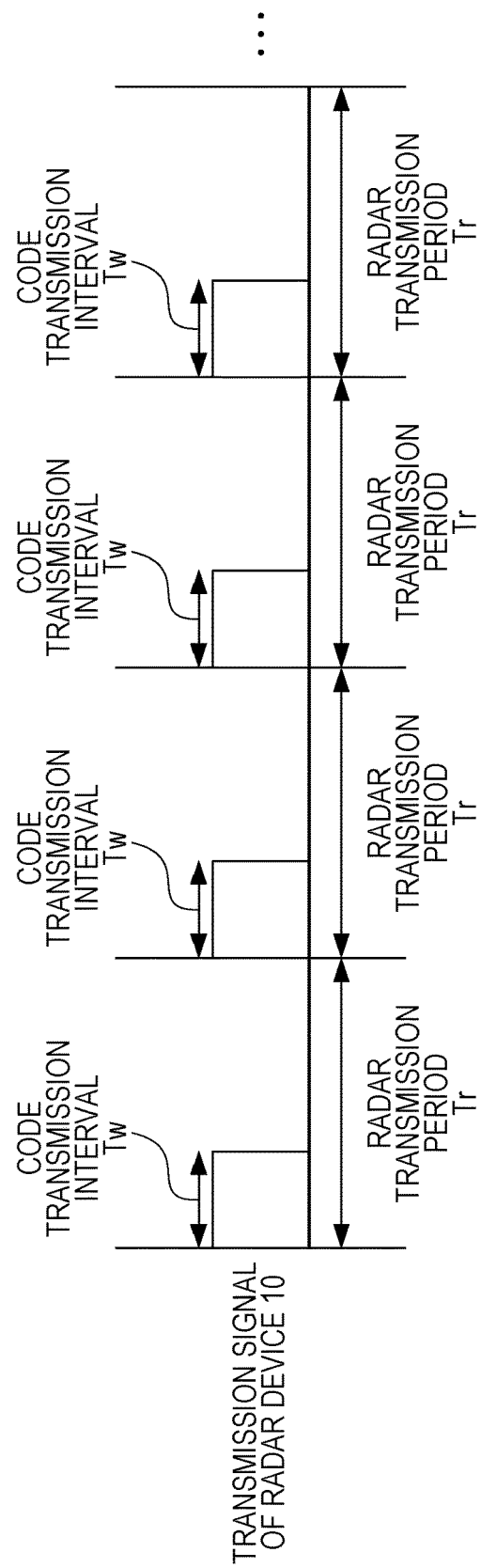
FIG. 4 is a diagram illustrating an example of a radar transmission signal according to one embodiment of the present disclosure.

FIG. 4 illustrates a radar transmission signal transmitted by the radar transmitting section 100. A pulse code sequence having a code length L is included in a code transmission interval Tw. A pulse code sequence is transmitted during the code transmission interval Tw in each radar transmission period Tr. A remaining interval (Tr–Tw) is a non-signal interval. Each pulse code ($a_n$) is subjected to pulse modulation using No samples. Accordingly, Nr (=No×L) sample signals are included in each code transmission interval Tw. That is, the sampling rate in the modulating section 103 is (No×L)/Tw. It is assumed that Nu samples are included in the non-signal interval (Tr–Tw).

Figure 5:
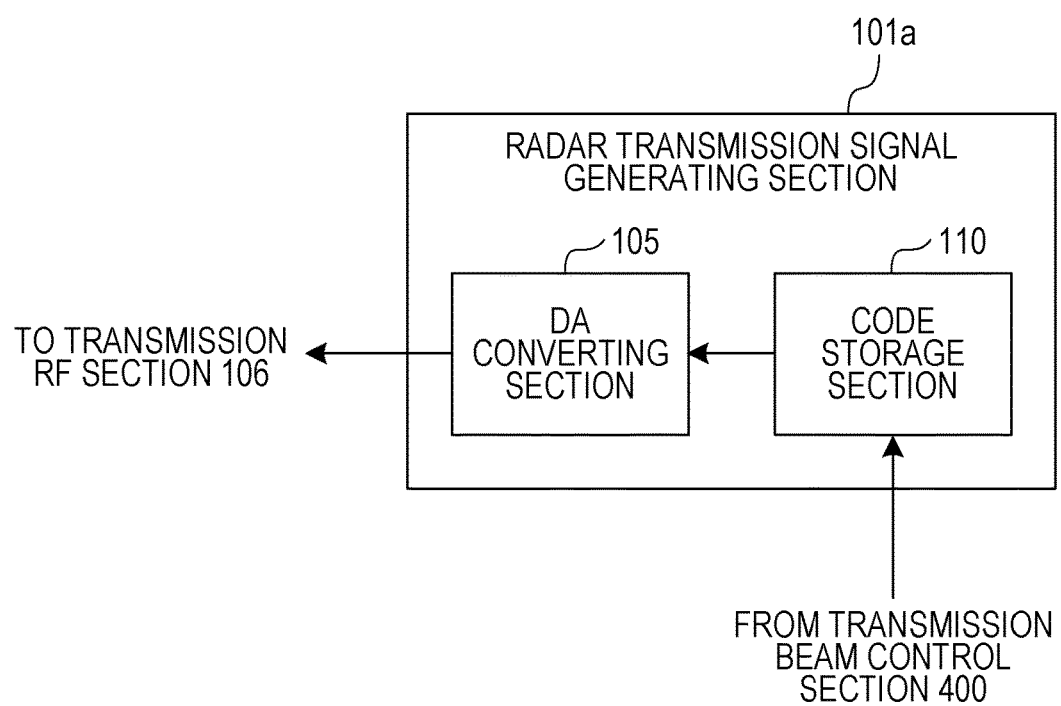
FIG. 5 is a block diagram illustrating another configuration of a radar transmission signal generating section according to one embodiment of the present disclosure.

Note that the radar transmitting section 100 may include a radar transmission signal generating section 101a illustrated in FIG. 5 instead of the radar transmission signal generating section 101. The radar transmission signal generating section 101a includes a code storage section 110v instead of the code generating section 102, the modulating section 103, and the LPF 104 illustrated in FIG. 3. The code storage section 110 stores therein in advance a code sequence generated by the code generating section 102 (FIG. 3) and reads out the code sequence in accordance with a control signal from the transmission beam control section 400.

Configuration of Radar Receiving Section 200

In FIG. 3, the radar receiving section 200 includes N_Rx reception antennas 202 that constitute an array antenna. Furthermore, the radar receiving section 200 includes N_Rx antenna system processing sections 201-1 to 201-N_Rx and a direction estimating section 214.

Each of the antenna system processing sections 201 includes the reception antenna 202, a reception RF section 203, and a signal processing section 207.

The reception antenna 202 receives a reflected signal that is a radar transmission signal reflected by a target (object) and then supplies, as a reception signal, the received reflected signal to the reception RF section 203.

The reception RF section 203 includes an amplifier 204, a frequency converter 205, and a quadrature detector 206. The reception RF section 203 generates a timing clock that is a predetermined multiple pf a reference signal received from the reference signal generating section 300 and operates on the basis of the generated timing clock. Specifically, the amplifier 204 amplifies the reception signal received from the reception antennas 202 to a predetermined level, the frequency converter 205 performs frequency conversion of the reception signal in a high-frequency (radio-frequency) band into a baseband reception signal, and the quadrature detector 206 converts the baseband reception signal into a baseband reception signal including an I signal and a Q signal.

The signal processing section 207 includes AD converting sections 208 and 209, a correlation computation section 210, an adding section 211, a switching section 212, and a Doppler frequency analyzing section 213. Note that the signal processing section 207 includes as many Doppler frequency analyzing sections 213 as the transmission beam set beam number $N_{BS}$.

The AD converting section 208 receives the I signal from the quadrature detector 206, and the AD converting section 209 receives the Q signal from the quadrature detector 206. The AD converting section 208 converts the I signal into digital data by performing sampling on the baseband signal including the I signal at a discrete time. The AD converting section 209 converts the Q signal into digital data by performing sampling on the baseband signal including the Q signal at a discrete time.

In the sampling performed by the AD converting sections 208 and 209, discrete sampling is performed Ns times per time Tp (=Tw/L), which is a time of a single pulse in the radar transmission signal. That is, the number of oversamples per pulse is Ns.

In the following description, a baseband reception signal at a discrete time k of the M-th radar transmission period Tr[M] as an output of the AD converting sections 208 and 209 is expressed as a complex signal $x(k, M) = Ir(k, M) + jQr(k, M)$ by using the I signal $Ir(k, M)$ and the Q signal $Qr(k, M)$. Furthermore, in the following description, a timing at which the radar transmission period (Tr) starts is used as a standard (k=1) of the discrete time k, and the signal processing section 207 periodically operates until k=(Nr+Nu) Ns/No, which is a sampling point before the end of the radar transmission period Tr. That is, k=1, ..., (Nr+Nu) Ns/No.

The correlation computation section 210 computes, every radar transmission period Tr, a correlation between (i) the discrete sample value $x(k, M)$ including the discrete sample values $Ir(k, M)$ and $Qr(k, M)$ received from the AD converting sections 208 and 209 and (ii) the pulse compression code $a_n$ (n=1, ..., L) having a code length L transmitted by the radar transmitting section 100. For example, the correlation computation section 210 computes a sliding correlation between the discrete sample value x(k, M) and the pulse compression code $a_n$. For example, a correlation computation value AC(k, M) obtained by sliding correlation computation at the discrete time k in the M-th radar transmission period Tr[M] is calculated on the basis of the following expression:

$$AC(k, M) = \sum_{n=1}^{L} x(k + N_s(n-1), M)a_n^* \qquad (6)$$

In the above expression, the asterisk (*) represents a complex conjugate operator.

The correlation computation section 210 performs correlation computation over a period of k=1, . . . , (Nr+Nu) Ns/No, for example, in accordance with the expression (6).

Figure 6:
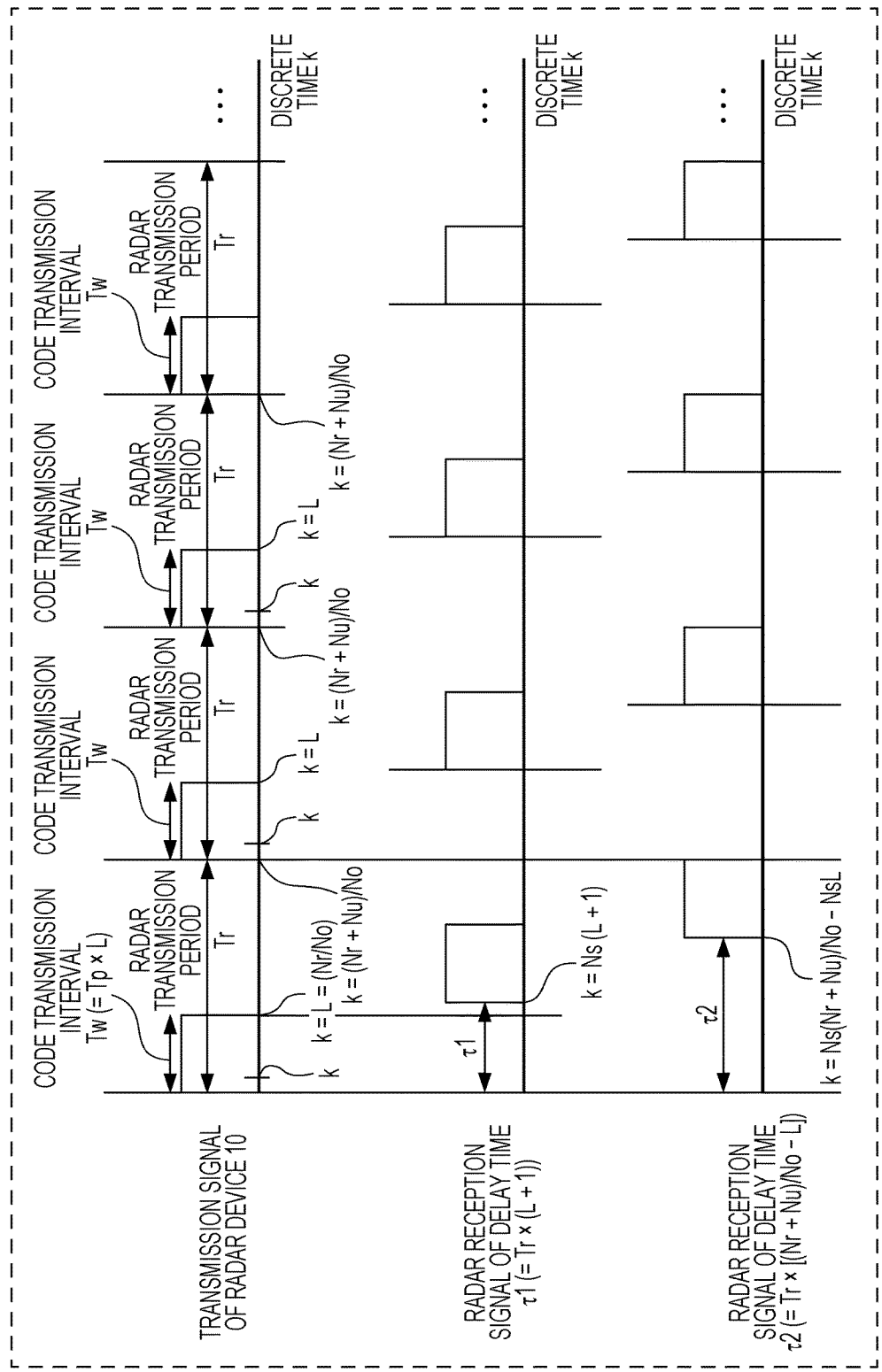
FIG. 6 is a diagram illustrating an example of a transmission timing of a radar transmission signal and a measurement range according to one embodiment of the present disclosure.

The present embodiment is not limited to the case where the correlation computation section 210 performs correlation computation over the period of k=1, . . . , (Nr+Nu) Ns/No. The measurement range (i.e., the range of k) may be limited in accordance with a range in which a target to be detected by the radar device 10 exists. This makes it possible to reduce the amount of computation processing of the correlation computation section 210. For example, the correlation computation section 210 may limit the measurement range to k=Ns (L+1), . . . , (Nr+Nu) Ns/No−NsL. In this case, as illustrated in FIG. 6, the radar device 10 does not perform measurement during a time interval corresponding to the code transmission interval Tw. Even in a case where a radar transmission signal directly goes around to the radar receiving section 200, this allows the radar device 10 to perform measurement excluding the influence of the radar transmission signal going around to the radar receiving section 200 because the correlation computation section 210 does not perform processing during a period (at least a period of less than τ1) in which the radar transmission signal goes around to the radar receiving section 200. In a case where the measurement range (the range of k) is limited, the adding section 211, the Doppler frequency analyzing section 213-1~$N_{BS}$ and the direction estimating section 214 that are described below also perform processing in the limited measurement range (the limited range of k). This makes it possible to reduce the amount of processing in each of these sections, thereby reducing power consumption in the radar receiving section 200.

The adding section 211 adds up (coherent integration) correlation computation values AC(k, M) over the predetermined number (Np) of radar transmission periods Tr (Tr× Np) by using the correlation computation values AC(k, M) received from the correlation computation section 210 every discrete time k of the M-th radar transmission period Tr. The adding (coherent integration) processing performed Np times over the periods (Tr×Np) is expressed by the following expression:

$$CI(k, m) = \sum_{g=1}^{N_p} AC(k, N_p(m-1) + g) \qquad (7)$$

In the above expression, CI(k, m) is an added value of the correlation calculation values (hereinafter sometimes referred to as a correlation added value), Np is an integer of 2 or more, m is a natural number indicating an ordinal number of the number of additions in a case where the number of additions Np in the adding section 211 is used as a single unit.

The adding section 211 performs addition Np times by using, as a single unit, an output of the correlation computation section 210 obtained by using the radar transmission period Tr as a unit. That is, the adding section 211 calculates, every discrete time k, a correlation value Cl (k, m) while uniforming the timings of the discrete times k by using, as a single unit, the correlation calculation values AC(k, Np(m−1)+1) to AC (k, Np×m). This makes it possible to improve the SNR of reflected signals in a range in which reflected signals from targets have a high correlation due to the effect of adding up correlation calculation values Np times. It is therefore possible to improve measurement performance concerning estimation of arrival distances of targets.

In order to obtain an ideal addition gain, it is necessary that that phase components of correlation computation values overlap in a certain range in an addition interval in which addition of the correlation computation values is performed Np times. That is, it is preferable that the number of additions Np be set on the basis of an assumed maximum moving speed of a target to be measured. This is because as the assumed maximum speed of the target becomes higher, the amount of fluctuation of a Doppler frequency included in a reflected wave from the target becomes larger and a period of high correlation becomes shorter. In this case, the number of additions Np is small, and therefore the gain improvement effect produced by addition in the adding section 211 is small.

The switching section 212 selectively switches among $N_{BS}$ (corresponding to the transmission beam set beam number) Doppler frequency analyzing sections 213-1 to 213-$N_{BS}$ as a destination of a signal received from the adding section 211 every discrete time k in accordance with an instruction from the transmission beam control section 400.

For example, in a case where the transmission beam set beam number ($N_{BS}$) is 2, two Doppler frequency analyzing sections 213 are provided. The Doppler frequency analyzing section 213-1 receives a (2m−1)th output Cl(k, 2m−1) of the adding section 211 obtained every discrete time k. The Doppler frequency analyzing section 213-2 receives a (2m) th output Cl(k, 2m) of the adding section 211 obtained every discrete time k. Note that k=k, . . . , (Nr+Nu) Ns/No.

In a case where the transmission beam set beam number is $N_{BS}$, the signal processing section 207 includes $N_{BS}$ Doppler frequency analyzing sections 213. For example, a y-th Doppler frequency analyzing section 213-y receives a {$N_{BS}$(m−1)+y}th output Cl(k, $N_{BS}$(m−1)+y) of the adding section 211 obtained every discrete time k. Note that y=1, . . . , $N_{BS}$, and k=1, . . . , (Nr+Nu) Ns/No.

The Doppler frequency analyzing section 213 performs Doppler frequency analyzing processing on an output of the adding section 211 received from the switching section 212. The following describes operation in the y-th Doppler frequency analyzing section 213-y assuming that the transmission beam set beam number is $N_{BS}$. Note that y=1, . . . , $N_{BS}$.

The Doppler frequency analyzing section 213-y performs coherent integration while uniforming timings of the discrete times k by using, as a single unit, Cl(k, $N_{BS}$Nc(w−1)−1)+y) to Cl (k, $N_{BS}$(Nc×w−1)+y) that are Nc outputs of the adding section 211 obtained every discrete time k. For example, the Doppler frequency analyzing section 213-y performs coherent integration after correcting a phase fluctuation $\Phi(fs)=2\pi fs\ (T_r \times N_p \times N_{BS})\Delta\Phi$ according to 2Nf different Doppler frequencies $fs\Delta\Phi$ as shown by the following expression:

$$FT\_CI_{y,Nant}(k, fs, w) = \sum_{q=0}^{N_c-1} CI(k, N_{BS}(N_c(w-1)+q)+y)\exp[-j\phi(f_s)q] \quad (8)$$

$$= \sum_{q=0}^{N_c-1} CI(k, N_{BS}(N_c(w-1)+q)+y)$$

$$\exp[-j2\pi f_s(T_r N_p N_{BS}q)\Delta\phi]$$

In the above expression, $FT\_CI_{y,Nant}(k, fs, w)$ is a w-th output of the Doppler frequency analyzing section 213-y and is a result of coherent integration of the Doppler frequencies $fs\Delta\Phi$ at the discrete time k in a Nant-th antenna system processing sections 201. Note that Nant=1 to N_Rx, fs=−Nf+1, ..., 0, ..., Nf, k=1, ..., (Nr+Nu) Ns/No, w is a natural number, and $\Delta\Phi$ is a phase rotation unit.

In this way, each antenna system processing section 201 obtains $FT\_CI_{y,Nant}(k, -Nf+1, w), \ldots, FT\_CI_{y,Nant}(k, Nf-1, w)$, which are results of coherent integration according to 2Nf Doppler frequency components obtained every discrete time k, every plural radar transmission periods Tr $(T_r \times N_p \times N_{BS} \times N_c)$, i.e., every second switching period. Note that j is an imaginary unit.

In a case where $\Delta\Phi=1/N_c$, the processing of the Doppler frequency analyzing section 213 is equivalent to discrete Fourier transform (DFT) processing of an output of the adding section 211 at a sampling interval $T_m=(T_r \times N_p \times N_{BS})$ at a sampling frequency $f_m=1/T_m$.

By setting Nf to a power of 2, fast Fourier transform (FFT) processing can be applied in the Doppler frequency analyzing section 213. This makes it possible to markedly reduce the amount of computation. In this case, in a case where Nf>Nc, FFT processing can be also applied by performing zero padding processing $(Cl(k, N_{BS}(Nc(w-1)+q)+y)=0)$ in a region where q>Nc, thereby markedly reducing the amount of computation.

The Doppler frequency analyzing section 213 may sequentially perform the multiply-accumulate operation indicated by the expression (8) without performing FFT processing. That is, the Doppler frequency analyzing section 213 may generate a coefficient $\exp[-j2\pi fsT_rNpN_{BS}q\Delta\varphi]$ corresponding to fs=−Nf+1, ..., 0, ..., Nf−1 for NC outputs $Cl(k, N_{BS}(Nc(w-1)+q)+y)$ of the adding section 211 obtained every discrete time k and then sequentially perform the multiply-accumulate operation. Note that q=0 to Nc−1.

In the following description, outputs $FT\_CI_{y,1}(k, fs, w)$, $FT\_CI_{y,2}(k, fs, w), \ldots, FT\_CI_{y,Na}(k, fs, w)$ from the y-th Doppler frequency analyzing section 213-y that are obtained by performing similar processing in the Na (=N_Rx) antenna system processing sections 201 are collectively referred to as a correlation vector $h_y(k, fs, w)$. The correlation vector $h_y(k, fs, w)$ is used for description of direction estimation processing (described later), performed for reflected signals from targets, based on phase differences among the reception antennas 202. Note that y=1, ..., $N_{BS}$.

$$h_y(k, fs, w) = \begin{bmatrix} FT\_CI_{y,1}(k, fs, w) \\ FT\_CI_{y,2}(k, fs, w) \\ \vdots \\ FT\_CI_{y,Na}(k, fs, w) \end{bmatrix} \quad (9)$$

The correlation vector may be calculated by using one of the plurality of antenna system processing sections 201 as a reference phase as indicated by the following expression instead of the correlation matrix $h_y(k, fs, w)$ indicated by the expression (9):

$$h_y(k, fs, w) = \begin{bmatrix} FT\_CI_{y,1}(k, fs, w) \\ FT\_CI_{y,2}(k, fs, w) \\ \vdots \\ FT\_CI_{y,Na}(k, fs, w) \end{bmatrix} \frac{FT\_CI_{y,1}(k, fs, w)^*}{|FT\_CI_{y,1}(k, fs, w)|} \quad (10)$$

In the above expression, the superscript suffix asterisk (*) represents a complex conjugate operator. Note also that k=1, ..., (Nr+Nu) Ns/No.

The processing in each section of the signal processing section 207 has been described above.

The direction estimating section 214 calculates a correlation vector $h_{y\_after\_cal}(k, fs, w)$ by correcting phase deviations and amplitude deviations among the antenna system processing sections 201 by using an array correction value for correlation vectors $h_y(k, fs, w)$ from the w-th Doppler frequency analyzing section 213-y that are output by the antenna system processing sections 201-1 to 201-N_Rx. The correlation vector $h_{y\_after\_cal}(k, fs, w)$ is expressed by the following expression:

$$h_{y\_after\_cal}(k, fs, w) = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Na]} \end{bmatrix} h_y(k, fs, w) \quad (11)$$

Then, the direction estimating section 214 performs direction estimating processing based on phase differences of reflected signals among the reception antennas 202 by using the correlation vector $h_{y\_after\_cal}(k, fs, w)$. Specifically, the direction estimating section 214 calculates a direction estimation evaluation function value $P_y(\theta_u, k, fs, w)$ (where the orientation direction $\theta_u$ is variable) by using the correlation vector $h_{y\_after\_cal}(k, fs, w)$ obtained by correcting the phase deviations and the amplitude deviations every discrete time k and Doppler frequency $fs\Delta\Phi$ or a discrete time k and a Doppler frequency $fs\Delta\Phi$ at which norm of $h_{y\_after\_cal}(k, fs, w)$ or the square thereof is equal to or larger than a predetermined value:

$$DOA(k, fs, w) = \underset{\theta_u}{\arg\max} P_y(\theta_u, k, fs, w) \quad (12)$$

In the above expression, y=1, ..., $N_{BS}$, and u=1, ..., NU (the number of available transmission beam directions). Note that arg max P(x) is an operator that outputs a value in a domain in which a function value P(x) becomes maximum. The direction estimating section 214 determines, as an arrival direction estimation value DOA$_y$(k, fs, w), the orientation direction θ$_u$ in which the maximum value of the direction estimation evaluation function value P$_y$ (θ$_u$, k, fs, w) is obtained.

Note that the direction estimating section 214 may perform processing for limiting a variable range of the orientation direction θ$_u$ in the direction estimation processing on the basis of a control signal received from the transmission beam control section 400. That is, in a case where the correlation vector h$_y$ (k, fs, w) from the w-th Doppler frequency analyzing section 213-y is one that is output in the main beam direction θ$_{Tx}$ of the transmission beam, the variable range of the orientation direction θ$_u$ in the direction estimation processing may be limited to θ$_{Tx}$−BW/2 ≤ θ$_{Tx}$ ≤ θ$_{Tx}$+BW/2. Note that BW can be an angle that is approximately equal to the beam width of the transmission beam. This limits the range of the direction estimation processing to the angle that is approximately equal to the beam width of the main beam direction of the transmission beam and improves the reception SNR of the reflected waves from targets existing in the transmission beam direction, thereby increasing the accuracy of arrival angle estimation. Furthermore, it is possible to suppress a reflected wave from a target existing at an angle that is away by approximately the beam width of the transmission beam direction or larger. It is therefore possible to suppress a degradation of arrival angle separation performance even in a case where the number of reflected waves existing in the same range bin or the same Doppler bin is equal to or larger than the number of elements N_Rx of reception antennas 202.

The kind of evaluation function value P$_y$(θ$_u$, k, fs, w) varies depending on an arrival direction estimation algorism. For example, an estimation method using an array antenna disclosed in Direction-of-arrival estimation using signal subspace modeling Cadzow, J. A.; Aerospace and Electronic Systems, IEEE Transactions on Volume: 28, Issue: 1 Publication Year: 1992, Page(s): 64-79 may be used.

For example, a beamformer method can be expressed by the following expression. Alternatively, a method such as Capon, or MUSIC is also applicable.

$$P(\theta_u, k, fs, w) = a(\theta_u)^H H_{y\_after\_cal}(k, fs, w) a(\theta_u) \quad (13)$$

In the above expression, the superscript suffix H is an Hermitian transpose operator. H$_{y\_after\_cal}$ (k, fs, w) is a correlation matrix, which can be any of the following expressions (14) to (17). In the expressions (15) to (17), DL is a predetermined integer.

$$H_{y\_after\_cal}(k, fs, w) = h_{y\_after\_cal}(k, fs, w) h_{y\_after\_cal}(k, fs, w)^H \quad (14)$$

$$H_{y\_after\_cal}(k, fs, w) = \sum_{B=k-DL}^{k+DL} h_{y\_after\_cal}(B, fs, w) h_{y\_after\_cal}(B, fs, w)^H \quad (15)$$

$$H_{y\_after\_cal}(k, fs, w) = \sum_{B=fs-DL}^{fs+DL} h_{y\_after\_cal}(k, B, w) h_{y\_after\_cal}(k, B, w)^H \quad (16)$$

$$H_{y\_after\_cal}(k, fs, w) = \sum_{B=w-DL}^{w+DL} h_{y\_after\_cal}(k, fs, B) h_{y\_after\_cal}(k, fs, B)^H \quad (17)$$

By generating a correlation matrix including a discrete time (B=(k−DL) to (k+DL)) adjacent to the discrete time k as shown in the expression (15), it is possible to suppress noise. As a result, it is possible to increase the accuracy of the direction estimation processing. Furthermore, by generating a correlation matrix including a Doppler frequency component (B=(fs−DL) to (fs+DL)) adjacent to the Doppler frequency fsΔΦ as shown in the expression (16), it is possible to suppress noise. As a result, it is possible to increase the accuracy of the direction estimation processing. Furthermore, by generating a correlation matrix including previous and subsequent outputs (B=(w−DL) to (w+DL)) of the w-th output as shown in the expression (17), it is possible to suppress noise. As a result, it is possible to increase the accuracy of the direction estimation processing.

Then, the direction estimating section 214 outputs, as a radar positioning result, the discrete time k, the Doppler frequency fsΔΦ, and the angle θ$_u$ on the basis of the calculated w-th arrival direction estimation value DOA$_y$(k, fs, w).

Figure 7:
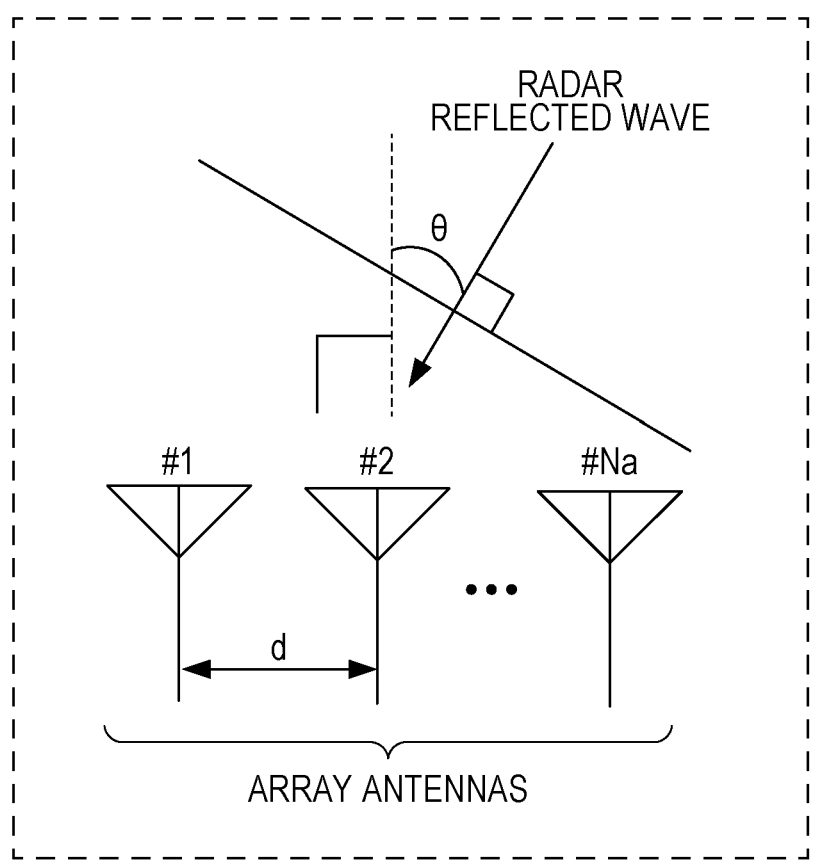
FIG. 7 is a diagram illustrating a relationship between the way in which an array antenna is disposed and an arrival angle.

An N_Rx next column vector whose element is complex response of the array antenna (the reception antennas 202) in a case where reflected waves of the radar transmission signal arrive from the θ$_u$ direction is defined as a directional vector a (θ$_u$). The directional vector a (θ$_u$) represents a phase difference that is geometrically optically calculated on the basis of an element interval between the reception antennas 202. For example, in a case where the array antenna (the reception antennas 202) is disposed on a straight line at regular intervals d as illustrated in FIG. 7, the directional vector a (θ$_u$) is expressed by the following expression:

$$a(\theta_u) = \begin{bmatrix} 1 \\ \exp\{j2\pi d \sin\theta_u / \lambda\} \\ \vdots \\ \exp\{j2\pi(N_a - 1)d\sin\theta_u / \lambda\} \end{bmatrix} \quad (18)$$

In the above expression, θ$_u$ is changed at a predetermined orientation interval β in an orientation range in which arrival direction estimation is performed. For example, θ$_u$ is set as follows:

$$\theta_u = \theta min + u\beta, u = 0, \ldots, NU$$

$$NU = \text{floor}[(\theta max - \theta min)/\beta] + 1$$

where floor (x) is a function that returns a maximum integer that does not exceed a real number x.

The time information k may be output after converted into distance information. The following expression can be used to convert the time information k into distance information R(k):

$$R(k) = k \frac{T_w C_0}{2L} \quad (19)$$

where Tw is a code transmission interval, L is a pulse code length, and C$_O$ is the speed of light.

The Doppler frequency information (fsΔΦ) may be output after converted into a relative speed component. The following expression may be used to convert the Doppler frequency fsΔΦ into a relative speed component vd(fs):

$$v_d(f_s) = \frac{\lambda}{2} f_s \Delta\theta \quad (20)$$

where λ is the wavelength of a carrier frequency of an RF signal output by the transmission RF sections 107.

Operation of Radar Device 10

Operation of the radar device 10 having the above configuration is described below.

Operation of transmission beam control in the transmission beam control section 400 is described below with reference to FIGS. 8 and 9.

The transmission beam control section 400 performs variable control of the main beam direction at intervals of $\Delta\theta_{Tx}$ within a beam variable range $\theta_{min} \leq \theta_{Tx} \leq \theta_{max}$.

In this example, the transmission beam control section 400 sets, within the beam variable range, a transmission beam direction (main beam direction) used for transmission of a radar transmission signal from among four transmission beam directions $\theta_{Tx(u1)}$ to $\theta_{Tx(u4)}$. In this example, a transmission beam set constituted by a pair ($\theta_{Tx(u1)}$, $\theta_{Tx(u2)}$) and a transmission beam set constituted by a pair ($\theta_{Tx(u3)}$, $\theta_{Tx(u4)}$) are used. That is, the transmission beam set bam number ($N_{BS}$) is 2. Note that the number of transmission beam sets may be 3 or more, and the transmission beam set beam number ($N_{BS}$) may be 3 or more.

Figure 8:
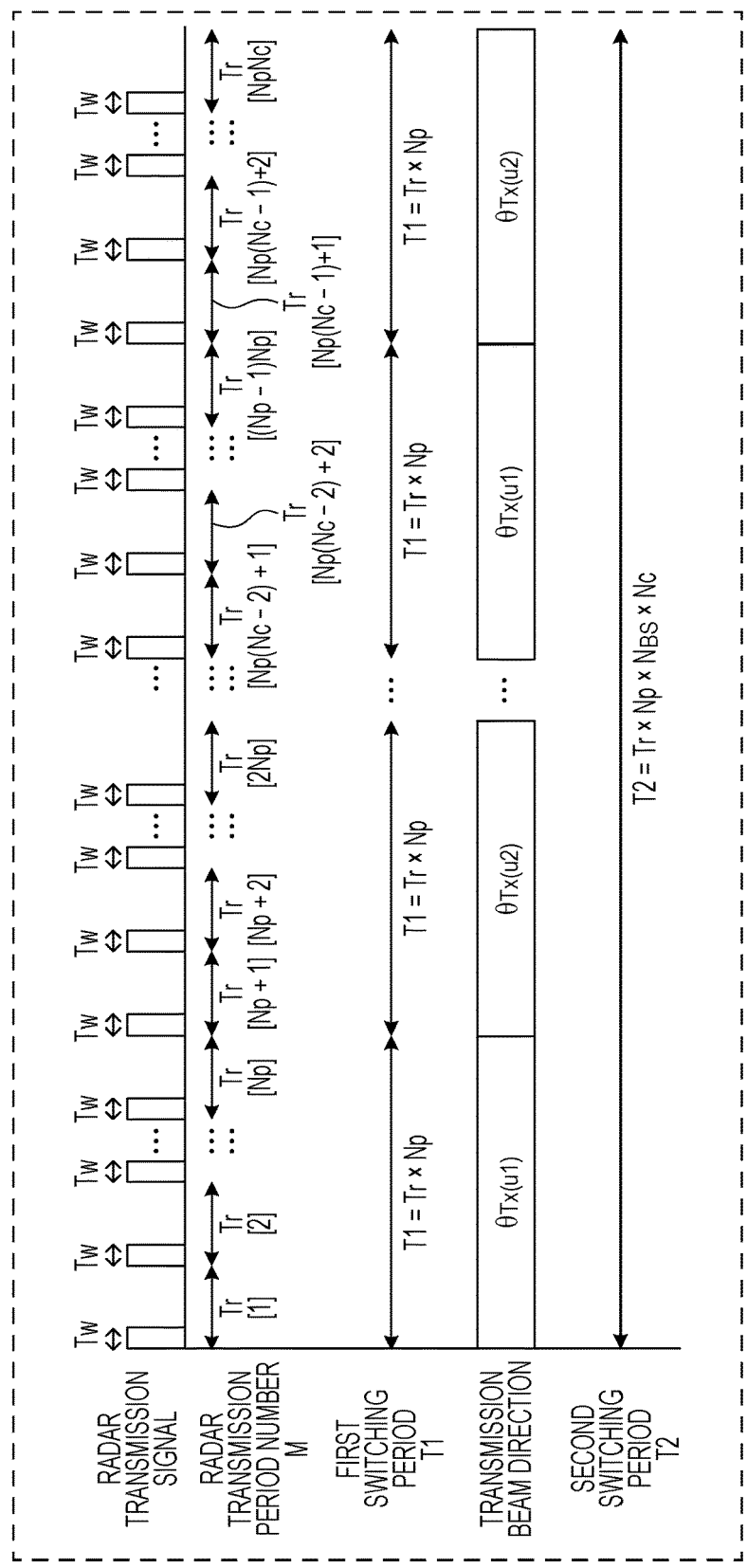
FIG. 8 is a diagram for explaining a radar transmission signal transmission control operation according to one embodiment of the present disclosure.

(1) As illustrated in FIG. 8, the transmission beam control section 400 sequentially switches among the plurality of transmission beam directions included in a transmission beam set every first switching period T1. For example, in FIG. 8, the transmission beam control section 400 sequentially stitches between transmission beam directions $\theta_{Tx(u1)}$ and $\theta_{Tx(u2)}$ every first switching period T1.

As illustrated in FIG. 8, the first switching period T1 (corresponding to a second period) is, for example, expressed by the product of the radar transmission period Tr and the number of additions Np of correlation computation values (i.e., reflected signals) in the coherent integration processing. That is, in FIG. 8, the first switching period T1 corresponds to a period in which the coherent integration processing for adding up reflected signals (correlation computation values) Np times is performed in the radar receiving section 200.

The transmission beam control section 400 repeats the operation (1) during the second switching period T2 (corresponding to a first period) that is the integral multiple of the first switching period T1. For example, in FIG. 8, the second switching period T2 is expressed by $N_{BS} N_c$ times ($N_{BS}$=2 in this example) of the first switching period T1. In other words, the second switching period T2 is the product of the first switching period T1 (Tr×Np), the transmission beam set beam number $N_{BS}$, the number of additions Nc of results of coherent integration (correlation added values) in the processing in the Doppler frequency analyzing section 213. That is, in FIG. 8, the second switching period T2 is period in which the Doppler frequency analyzing processing is performed on the result of coherent addition of the $N_{BS}$ transmission beam directions in the radar receiving section 200.

Figure 9:
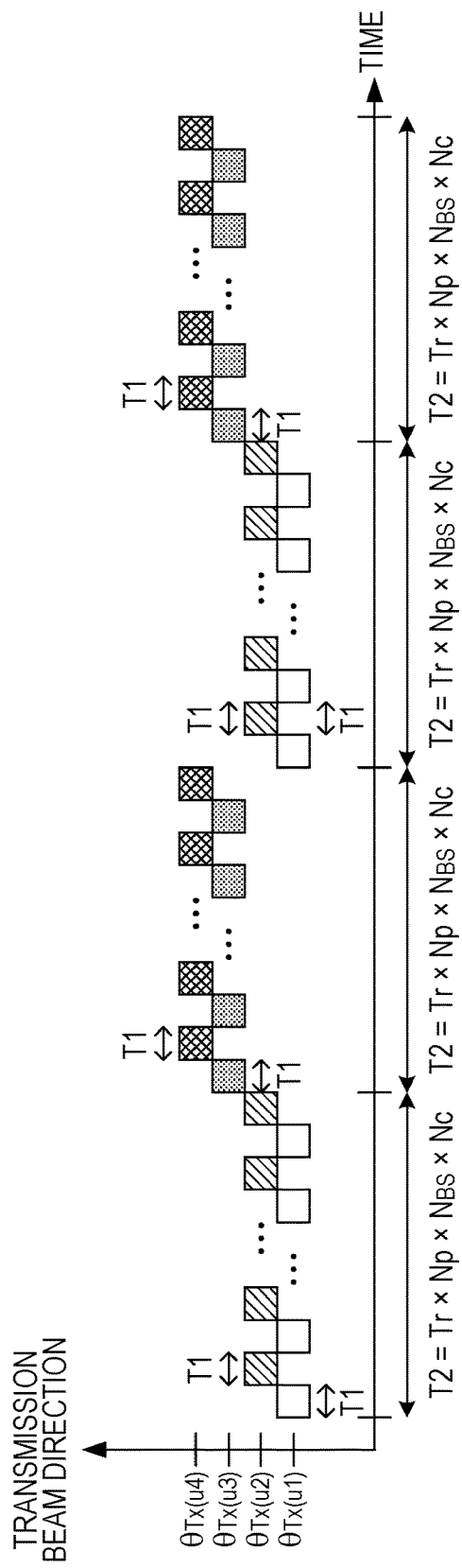
FIG. 9 is a diagram for explaining a radar transmission signal transmission control operation according to one embodiment of the present disclosure.

(2) As illustrated in FIG. 9, the transmission beam control section 400 switches the transmission beam set every second switching period T2. For example, in FIG. 9, the transmission beam control section 400 sequentially switches between the transmission beam set ($\theta_{Tx(u1)}$, $\theta_{Tx(u2)}$) and the transmission beam set ($\theta_{Tx(u3)}$, $\theta_{Tx(u4)}$) every second switching period T2.

The transmission beam control section 400 repeats the operation (2) until transmission of a radar transmission signal using all of the transmission beam sets (2 in FIG. 9) is completed.

(3) The transmission beam control section 400 repeats the operations (1) and (2).

Then, the radar transmitting section 100 (the transmission beam forming section 106) sets a transmission beam direction set by the transmission beam control section 400 from among transmission beam directions in which a beam is scanned at predetermined angular intervals within the beam variable range. That is, the radar transmitting section 100 transmits a radar transmission signal while switching the transmission beam direction by the unit of the number of additions (the first switching period T1) in the coherent integration in the radar receiving section 200 (the adding section 211). Furthermore, the radar transmitting section 100 transmits the radar transmission signal while switching the transmission beam set every second switching period.

Note that there are cases where, at the time of switching of the transmission beam, it takes a certain amount of time (a transition time $T_{Beam\_SW}$) until the switching operation stabilizes due to properties of an analog circuit that forms the transmission beam in the transmission beam forming section 106. In such cases, the transmission beam control section 400 may set the first switching period T1 and the second switching period T2 at a timing earlier than a timing of a code transmission interval (for example, at a timing earlier by at least the transition time $T_{Beam\_SW}$). This makes it possible to complete the switching operation of the analog circuit that forms the transmission beam in the transmission beam forming section 106 even in the code transmission interval after switching of the transmission beam, thereby allowing the radar transmitting section 100 to transmit a pulse code sequence in a stable state.

Meanwhile, the radar receiving section 200 (the adding section 211) calculates a correlation added value Cl(k,m) by adding correlation computation values AC(k, M) every discrete time k over the first switching period T1 (=Tr×Np) (i.e., Np times), for example, in accordance with the expression (7). For example, in FIG. 8, the adding section 211 calculates a correlation added value Cl(k,m) for the transmission beam direction $\theta_{Tx(u1)}$ and a correlation added value Cl(k,m) for the transmission beam direction $\theta_{Tx(u2)}$ every first switching period T1.

Next, the radar receiving section 200 (the switching section 212) outputs a correlation added value Cl(k, M) obtained every discrete time k while switching among the Doppler frequency analyzing sections 213-1 to 213-NBS whose number corresponds to the transmission beam set beam number ($N_{BS}$). For example, in FIG. 8, the switching section 212 outputs the (2m−1)th output Cl(k, 2m−1) from the adding section 211 to the Doppler frequency analyzing section 213-1, and outputs the (2m)th output Cl(k, 2m) from the adding section 211 to the Doppler frequency analyzing section 213-2. Note that m is an ordinal number incremented every first switching period T1 assuming that the top first switching period T1 illustrated in FIG. 8 is 1.

That is, the switching section 212 outputs the correlation added values Cl(k,m) calculated for the transmission beam directions $\theta_{Tx(u1)}$ and $\theta_{Tx(u2)}$ illustrated in FIG. 8 to respective different Doppler frequency analyzing sections 213. Thus, as illustrated in FIG. 8, during the second switching period T2, Nc correlation added values Cl(k,m) for the transmission beam direction $\theta_{Tx(u1)}$ are input to the Doppler frequency analyzing section 213-1, and Nc correlation added values Cl(k,m) for the transmission beam direction $\theta_{Tx(u2)}$ are input to the Doppler frequency analyzing section 213-2.

Then, the radar receiving section 200 (each Doppler frequency analyzing section 213) detects a peak Doppler spectrum by performing Doppler frequency analysis on the Nc correlation added values Cl(k,m) for the transmission beam direction $\theta_{Tx(u1)}$ or $\theta_{Tx(u2)}$ in accordance with the expression (8).

As described above, the radar device 10 according to the present embodiment sequentially switches among transmission beam directions included in a single transmission beam set within the second switching period T2 in which the Doppler frequency analysis processing is performed on the transmission beam set including at least two transmission beam directions. Furthermore, the radar device 10 sequentially switches among a plurality of transmission beam sets every second switching period T2. Furthermore, within the second switching period T2, the radar device 10 sequentially switches among transmission beam directions included in a transmission beam set every first switching period T1 in which the coherent integration processing is performed.

Accordingly, the observation time of the Doppler frequency in the radar device 10 in the transmission beam directions included in the transmission beam set is Np×Nc×$N_{BS}$×Tr. That is, as illustrated in FIG. 8, although a period (setting period) in which each transmission beam direction is set is Np×Nc×Tr, the observation period of the Doppler frequency in the transmission beam directions is $N_{BS}$ times longer than the setting period since the transmission beam direction is alternately switched among the transmission beam directions included in the transmission beam set. As described above, when viewed per transmission beam direction included in the transmission beam set, a time interval in which the result of coherent integration is output can be made longer than an addition time interval in which the coherent integration is performed.

For example, in the present embodiment, a period in which a single transmission beam direction (for example, $\theta_{Tx(u1)}$) included in a transmission beam set is set is $1/N_{BS}$ as compared with a case where a single transmission beam direction (for example, $\theta_{Tx(u1)}$) is set in an observation period (for example, T2) of a predetermined Doppler frequency. That is, in the present embodiment, when viewed per transmission beam direction included in a transmission beam set, it is possible to maintain the observation period of the Doppler frequency in a case where a single transmission beam direction is set and to decrease the number of additions (shorten an addition period) in the coherent integration.

For example, as shown in the expression (3), the Doppler frequency resolution Δfd depends on the observation period of the Doppler frequency (Np×Nc×Tr). According to the present embodiment, even in a case where the number of coherent additions Np is reduced to $1/N_{BS}$ (the addition period is shortened), the observation period of the Doppler frequency is (Np×$N_{BS}$×Nc×Tr), that is, maintained at the same as that before the decrease of the number of coherent additions. That is, even in a case where the number of coherent additions per transmission beam direction is decreased, it is possible to suppress a degradation of the Doppler frequency resolution in the Doppler frequency analysis.

In this way, even in a case where the addition time interval in which the coherent integration is performed in the adding section 211 is shortened by increasing the number of transmission beam directions included in a transmission beam set, the time interval in which the result of coherent integration is output (the observation period of the Doppler frequency) can be made long to the same degree as that before the addition time interval in which the coherent integration is performed in the adding section 211 is shortened. Therefore, according to the present embodiment, it is possible to maintain the Doppler frequency resolution and shorten the beam scanning period.

Furthermore, according to the present embodiment, it is possible to shorten the addition time interval in which coherent integration per transmission beam direction is performed. Accordingly, even in a case where a target moves at a high speed, it is possible to suppress a decrease in coherent addition gain produced by the coherent integration in the adding section 211.

Modification 1

Figure 10:
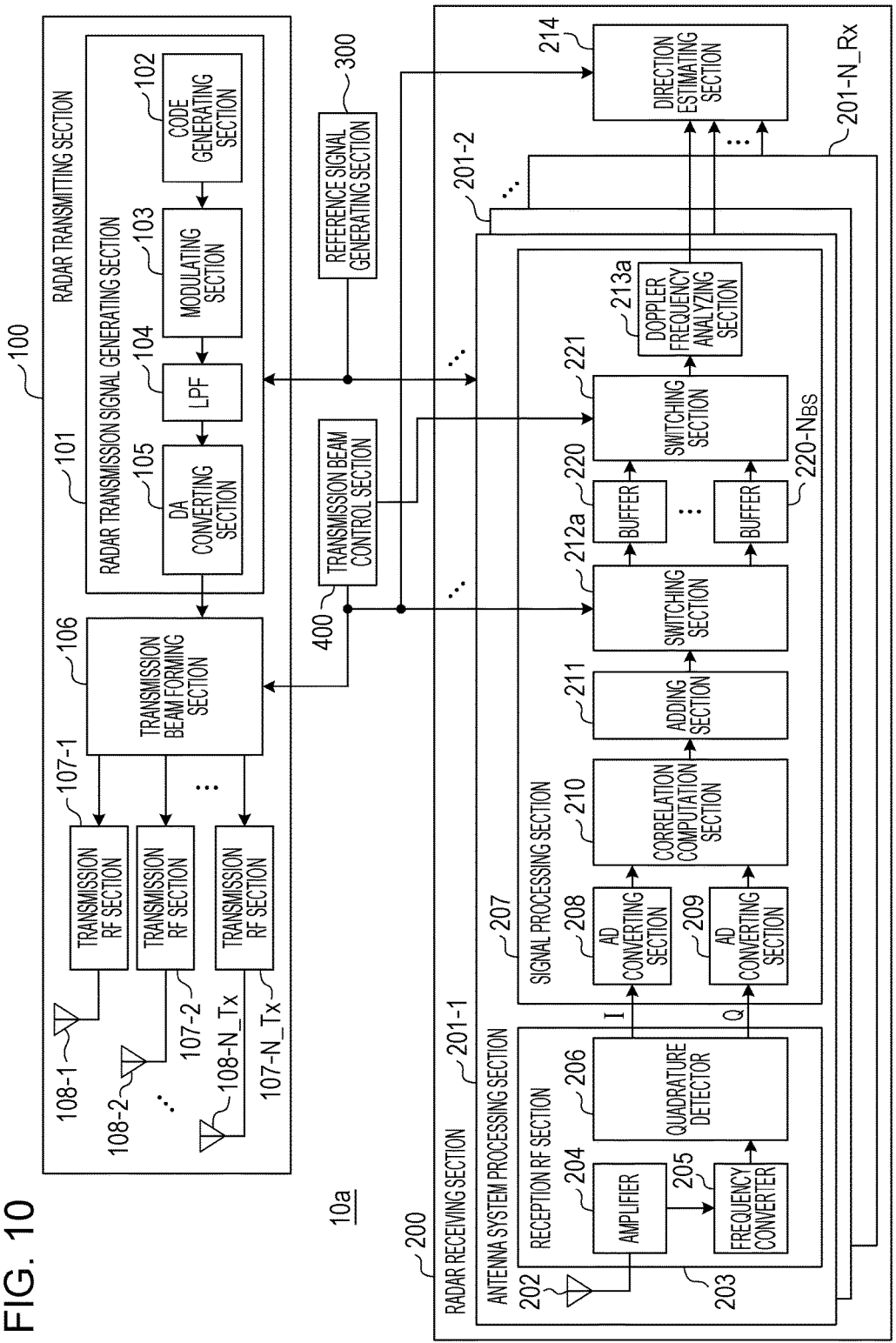
FIG. 10 is a block diagram illustrating a configuration of a radar device according to Modification 1 of the embodiment of the present disclosure.

In the present embodiment, a plurality of buffers 220 whose number corresponds to the transmission beam set beam number $N_{BS}$ may be provided as illustrated in FIG. 10 instead of a plurality of Doppler frequency analyzing sections 213 whose number corresponds to the transmission beam set beam number $N_{BS}$ as illustrated in FIG. 3. Specifically, in a radar device 10a illustrated in FIG. 10, the buffers 220-1 to 220-$N_{BS}$ correspond to respective transmission beam directions in a transmission beam set.

A switching section 212a outputs a correlation added value Cl(k, M) for each transmission beam direction to a corresponding one of the buffers 220-1 to 220-$N_{BS}$ while switching among the buffers 220-1 to 220-$N_{BS}$. That is, the buffer 220 temporarily stores therein a correlation added value Cl(k, M) for a corresponding transmission beam direction.

As with the switching section 212a, a switching section 221 switches among the correlation added values Cl(k, M) that are output from the buffers 220 corresponding to the respective transmission beam directions in accordance with control of the transmission beam control section 400. That is, the switching section 221 serially outputs the correlation added values Cl(k, M) for the respective transmission beams to the Doppler frequency analyzing section 213a by the unit of a time interval (Np×Nc×Tr).

The Doppler frequency analyzing section 213a performs Doppler frequency analyzing processing on the serially input correlation added values Cl(k, M) for the respective transmission beams.

Even in the radar device 10a having such a configuration, it is possible to maintain the Doppler frequency resolution and to shorten the beam scanning period.

Modification 2

In Modification 2, a case where a radar transmission signal that periodically fluctuates by using a radar transmission period that is longer than a first switching period T1 at which the transmission beam direction is switched among the transmission beam directions included in a transmission beam set is generated is described.

Figure 11:
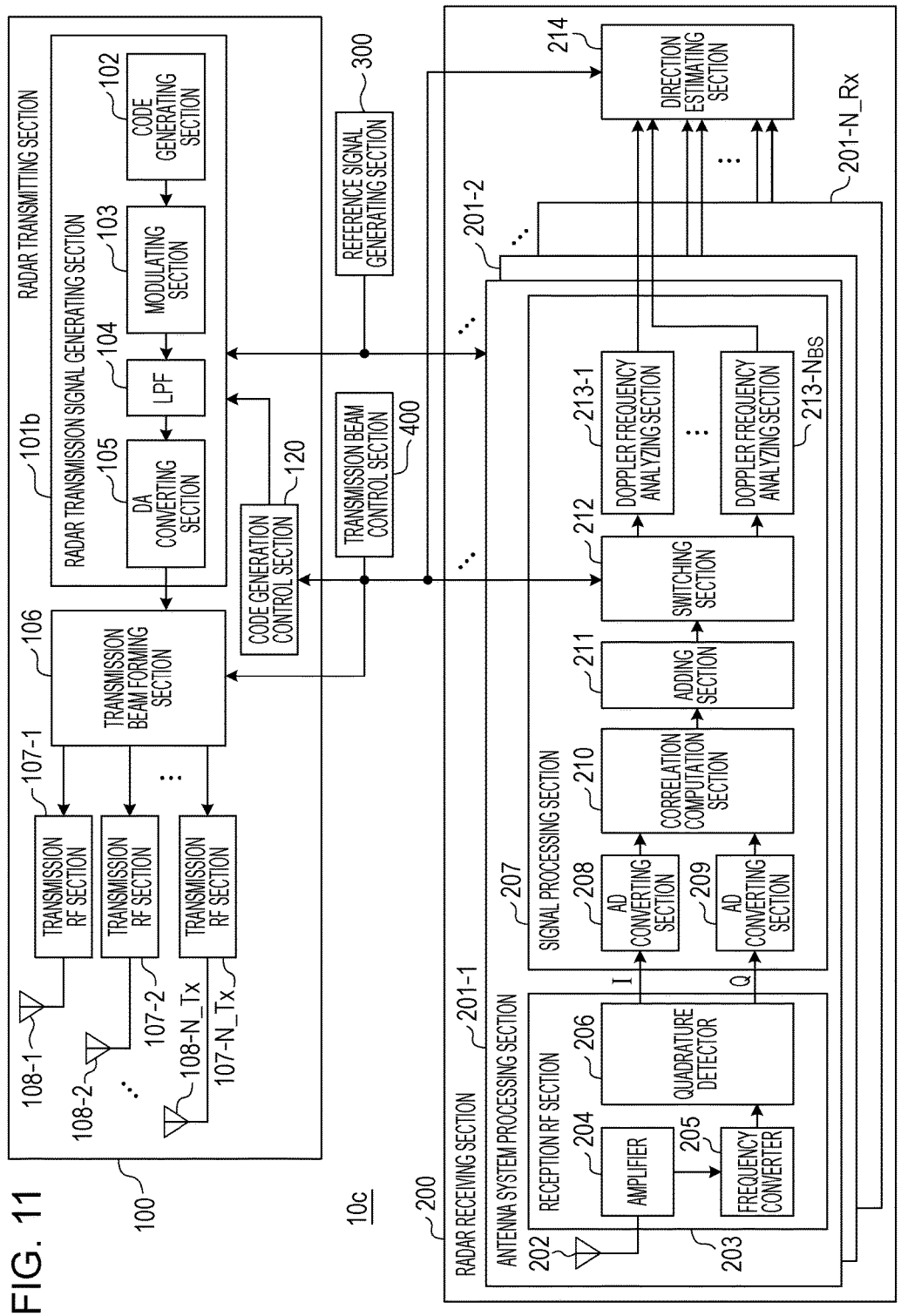
FIG. 11 is a block diagram illustrating a configuration of a radar device according to Modification 2 of one embodiment of the present disclosure.

FIG. 11 is a block diagram illustrating a configuration of a radar device 10c according to Modification 2.

A code generation control section 120 controls a radar transmission signal generating section 101 to generate a radar transmission signal that maintains a desired periodicity for each transmission beam direction included in a transmission beam set under control of a transmission beam control section 400.

In other words, the code generation control section 120 controls, for each transmission beam direction, codes of a single code sequence that cannot be transmitted at one time within a single first switching period T1 to be sequentially transmitted over a plurality of periods.

Specifically, the code generation control section 120 counts the number of transmission periods of a radar transmission signal for each transmission beam direction included in the transmission beam set on the basis of the first switching period T1 and the second switching period T2 instructed by the transmission beam control section 400. That is, the code generation control section 120 increments the counted value of the radar transmission period for each beam in each transmission beam set $N_{BS}$, i.e., for each transmission beam direction on the basis of the first switching period T1. Furthermore, the code generation control section 120 resets the counted value of the radar transmission period for each transmission beam direction on the basis of the second switching period T2.

A radar transmission signal generating section 101*b* generates a baseband radar transmission signal on the basis of the counted value of the radar transmission period for each transmission beam direction that is received from the code generation control section 120. For example, the radar transmission signal generating section 101*a* generates a radar transmission signal corresponding to the first switching period T1 in an initial period for a radar transmission signal for a certain transmission beam direction. Next, in a next period for the radar transmission signal for the certain transmission beam direction, the radar transmission signal generating section 101*a* generates a radar transmission signal corresponding to the first switching period T1 from a part following the radar transmission signal transited in the previous period. Thereafter, the radar transmission signal generating section 101*a* specifies the position of the transmitted part of the radar transmission signal (i.e., the transmission start position) on the basis of the counted value incremented every first switching period T1 for the same transmission beam direction and generates a radar transmission signal whose length corresponds to the first switching period T1.

The radar transmission signal generating section 101*a* performs the aforementioned operation for each transmission beam direction included in the transmission beam set.

In this way, for example, even in a case where a transmission beam direction is switched every first switching period T1 within the second switching period T2 as illustrated in FIG. 8, the radar transmission signal generating section 101*b* can generate a radar transmission signal that maintains a desired periodicity for each transmission beam direction.

Therefore, even in a case where a radar transmission signal that periodically fluctuates by using a radar transmission period that is longer than the first switching period T1 is used, it is possible to maintain the Doppler frequency resolution and to shorten a beam scanning period, as in the above embodiment.

Modification 3

In the above embodiment, a case where the transmission beam control section 400 causes first switching periods T1 for respective transmission beam directions included in a transmission beam set to have the same value as illustrated in FIGS. 8 and 9, and the adding section 211 performs, for each of the transmission beam directions, processing for adding up correlation computation values included in the first switching period T1 has been described.

Meanwhile, in Modification 3, a case where first switching periods T1 in which respective transmission beam directions included in a transmission beam set are set are different from each other is described. Specifically, the transmission beam control section 400 switches a transmission beam direction by using first switching periods $T1_{(1)}$, $T1_{(2)}$, ..., and $T1_{(NBS)}$ having different lengths for $N_{BS}$ transmission beam directions included in the transmission beam set.

Figure 12:
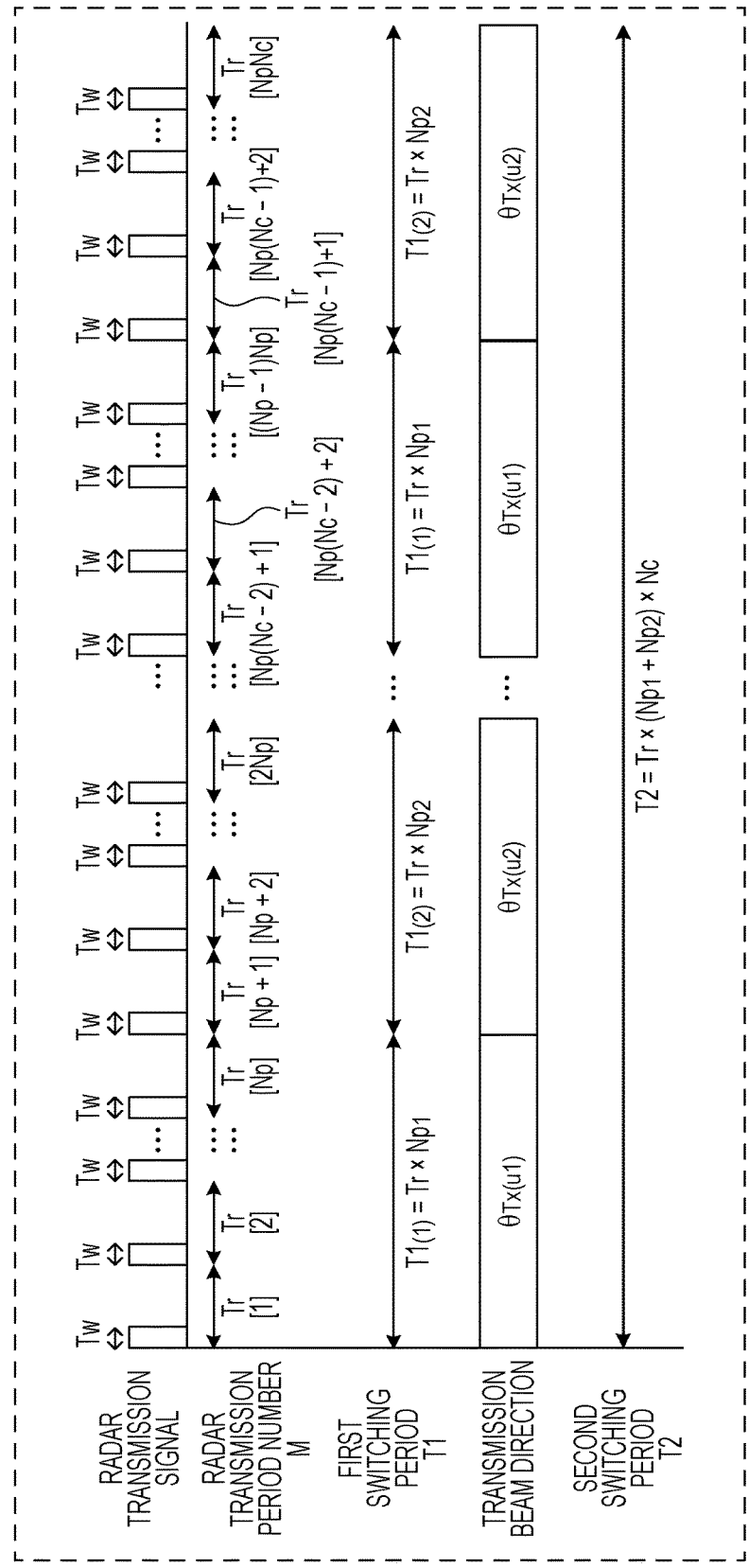
FIG. 12 is a diagram for explaining a radar transmission signal transmission control operation according to Modification 3 of one embodiment of the present disclosure.
Figure 13:
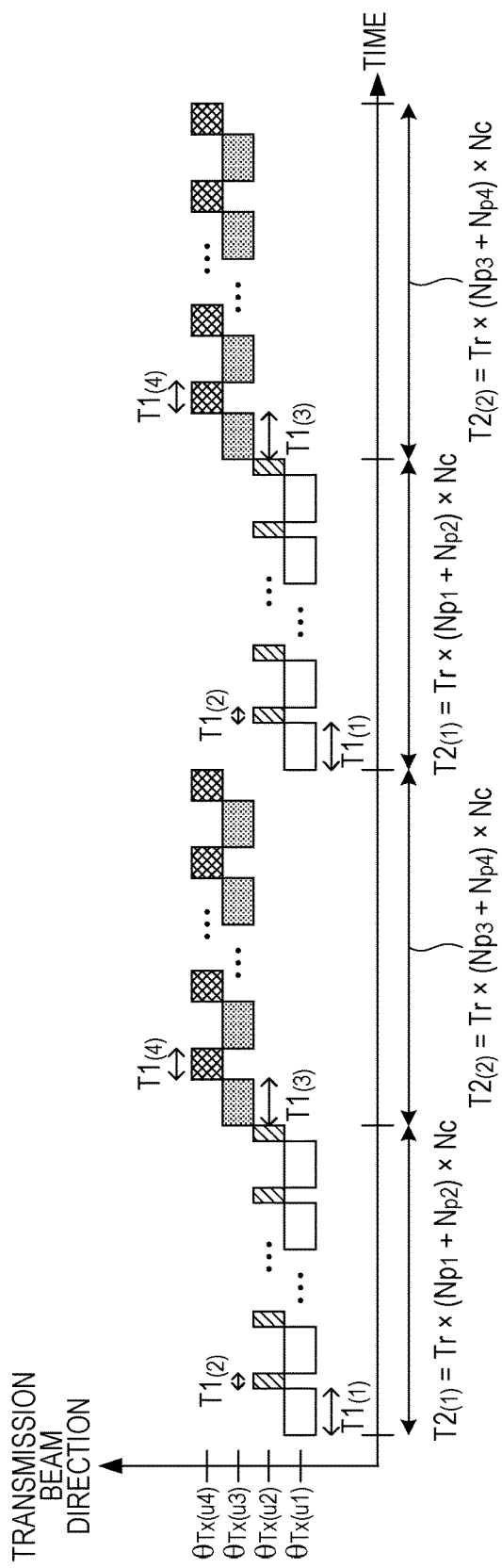
FIG. 13 is a diagram for explaining a radar transmission signal transmission control operation according to Modification 3 of one embodiment of the present disclosure.

An example of operation of Modification 3 is described below with reference to FIGS. 12 and 13. In FIGS. 12 and 13, a main beam direction used for transmission of a radar transmission signal is set from among four transmission beam directions $\theta_{Tx(u1)}$ to $\theta_{Tx(u4)}$ within a beam variable range as in FIGS. 8 and 9. Furthermore, two transmission beam sets ($\theta_{Tx(u1)}$, $\theta_{Tx(u2)}$) and ($\theta_{Tx(u3)}$, $\theta_{Tx(u4)}$) are set.

That is, $N_{BS}$=2 in FIGS. 12 and 13.

As illustrated in FIG. 13, the transmission beam control section 400 switches a transmission beam by using first switching periods $T1_{(1)}$ and $T1_{(2)}$ having different lengths for the two transmission beam directions ($\theta_{Tx(u1)}$, $\theta_{Tx(u2)}$) included in one transmission beam set. Similarly, as illustrated in FIG. 13, the transmission beam control section 400 switches a transmission beam by using different first switching periods $T1_{(3)}$ and $T1_{(4)}$ for the two transmission beam directions ($\theta_{Tx(u3)}$, $\theta_{Tx(u4)}$) included in the other transmission beam set.

In FIG. 12, the adding section 211 performs, for the transmission beam direction $\theta_{Tx(u1)}$, processing for adding up radar transmission signals (correlation computation values) $Np_1$ times every first switching period $T1_{(1)}$. Similarly, in FIG. 12, the adding section 211 performs, for the transmission beam direction $\theta_{Tx(u2)}$, processing for adding up radar transmission signals (correlation computation values) $Np_2$ times every first switching period $T1_{(2)}$. Similar processing is performed for the transmission beam directions $\theta_{Tx(u3)}$ and $\theta_{Tx(u4)}$. That is, the adding section 211 performs, for $N_{BS}$ transmission beam directions ($\theta_{Tx(u1)}$, $\theta_{Tx(u2)}$, ..., and $\theta_{Tx(uBS)}$), adding processing $Np_1$ times, $Np_2$ times, ..., and $Np_{BS}$ times, which are the number of additions included in the corresponding first switching periods $T1_{(1)}$, $T1_{(2)}$, ..., and $T1_{(BS2)}$, respectively.

As described above, in Modification 3, the switching period is variable depending on a transmission beam direction included in a transmission beam set. The adding section 211 performs adding processing as many times as the number of additions included in a first switching period T1. Since the first switching period T1 is variable depending on the transmission beam direction, an adding gain produced by coherent addition in the adding section 211 can be set variable.

For example, in a case where a planar antenna is constituted by transmission antennas 108, a transmission beam in a front direction of the planar antenna can obtain a higher directivity gain than a transmission beam in an oblique direction of the planar antenna. In view of this, in a case where transmission beam directions that are different in directivity gain are included in a single transmission beam set, the transmission beam control section 400 may cause a first switching period T1 for a transmission beam direction that is high in directivity gain to be shorter than a first switching period T1 for a transmission beam direction that is low in directivity gain. That is, among transmission beam directions included in a transmission beam set, a first switching period T1 for a transmission beam direction that is lower in directivity gain is set longer.

In this way, a coherent addition gain (i.e., the number of additions) for a transmission beam direction that is low in directivity gain becomes higher than that for a transmission beam direction that is high in directivity gain. That is, in Modification 3, detection distance smoothing within a detection area (transmission beam directions) of the radar device 10 can be achieved by taking into consideration both of a directivity gain and a coherent addition gain.

Note that the transmission beam control section 400 may set a longer first switching period T1 for a transmission beam direction for which a detection distance needs to be extended within a detection area among transmission beam directions included in a transmission beam set. This makes it possible to adjust a detection distance within the detection area to a desired value.

For example, in a case where the radar device 10 is attached to a front lateral side of a vehicle, a transmission beam direction corresponding to a front direction of the vehicle needs a longer detection distance than a transmission beam direction corresponding to a lateral direction of the vehicle. In view of this, the transmission beam control section 400 just needs to cause a first switching period T1 for the transmission beam direction corresponding to the front direction of the vehicle to be longer than that for the transmission beam direction corresponding to the lateral direction of the vehicle. It is thus possible to extend the detection distance in the front direction of the vehicle.

Figure 14:
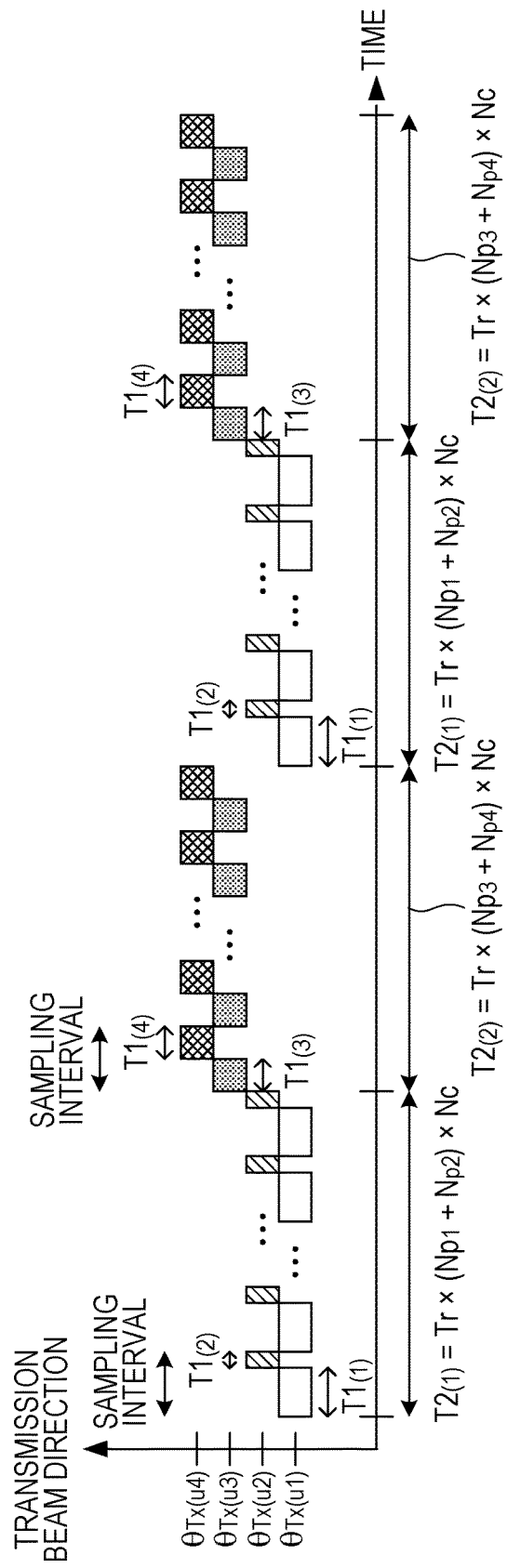
FIG. 14 is a diagram for explaining a radar transmission signal transmission control operation according to Modification 3 of one embodiment of the present disclosure.

The transmission beam control section 400 may control first switching periods T1 for respective transmission beam directions included in each transmission beam set so that a plurality of transmission beam sets are the same in terms of the sum of first switching periods T1. For example, in FIG. 14, first switching periods $T1_{(1)}$ and $T1_{(2)}$ are set for a transmission beam set ($\theta_{Tx(u1)}$, $\theta_{Tx(u2)}$), and first switching periods $T1_{(3)}$ and $T1_{(4)}$ are set for a transmission beam set ($\theta_{Tx(u3)}$, $\theta_{Tx(u4)}$). In this case, the transmission beam control section 400 sets the first switching periods T1 for the respective transmission beam directions so that $T1_{(1)}+T1_{(2)}=T1_{(3)}+T1_{(4)}$ is satisfied.

During a period using the transmission beam set ($\theta_{Tx(u1)}$, $\theta_{Tx(u2)}$), the adding section 211 performs, for the two transmission beam directions ($\theta_{Tx(u1)}$, $\theta_{Tx(u2)}$) ($N_{BS}=2$), adding processing as many times as the number of additions $Np_1$ and $Np_2$ included in the first switching period $T1_{(1)}$ and $T1_{(2)}$, respectively. Similarly, during a period using the transmission beam set ($\theta_{Tx(u3)}$, $\theta_{Tx(u4)}$), the adding section 211 performs, for the two transmission beam directions ($\theta_{Tx(u3)}$, $\theta_{Tx(u4)}$) ($N_{BS}=2$), adding processing as many times as the number of additions $Np_3$ and $Np_4$ included in the first switching periods $T1_{(3)}$ and $T1_{(4)}$, respectively.

Because of the relationship $T1_{(1)}+T1_{(2)}=T1_{(3)}+T1_{(4)}$, the transmission beam sets are the same in terms of a sampling interval that is output by the adding section 211 and input to each Doppler frequency analyzing section 213. This uniforms Doppler frequencies fsΔΦ (fs=−Nf+1, . . . , 0, . . . , Nf), thereby allowing all of the transmission beams to be the same in terms of Doppler frequency resolution. This makes it unnecessary to perform interpolation processing for causing Doppler frequencies of respective transmission beams included in different transmission beam sets to be the same.

Modification 4

In Modification 4, a case where a radar device according to the present disclosure is mounted in a mobile object such as a vehicle is described.

Figure 15:
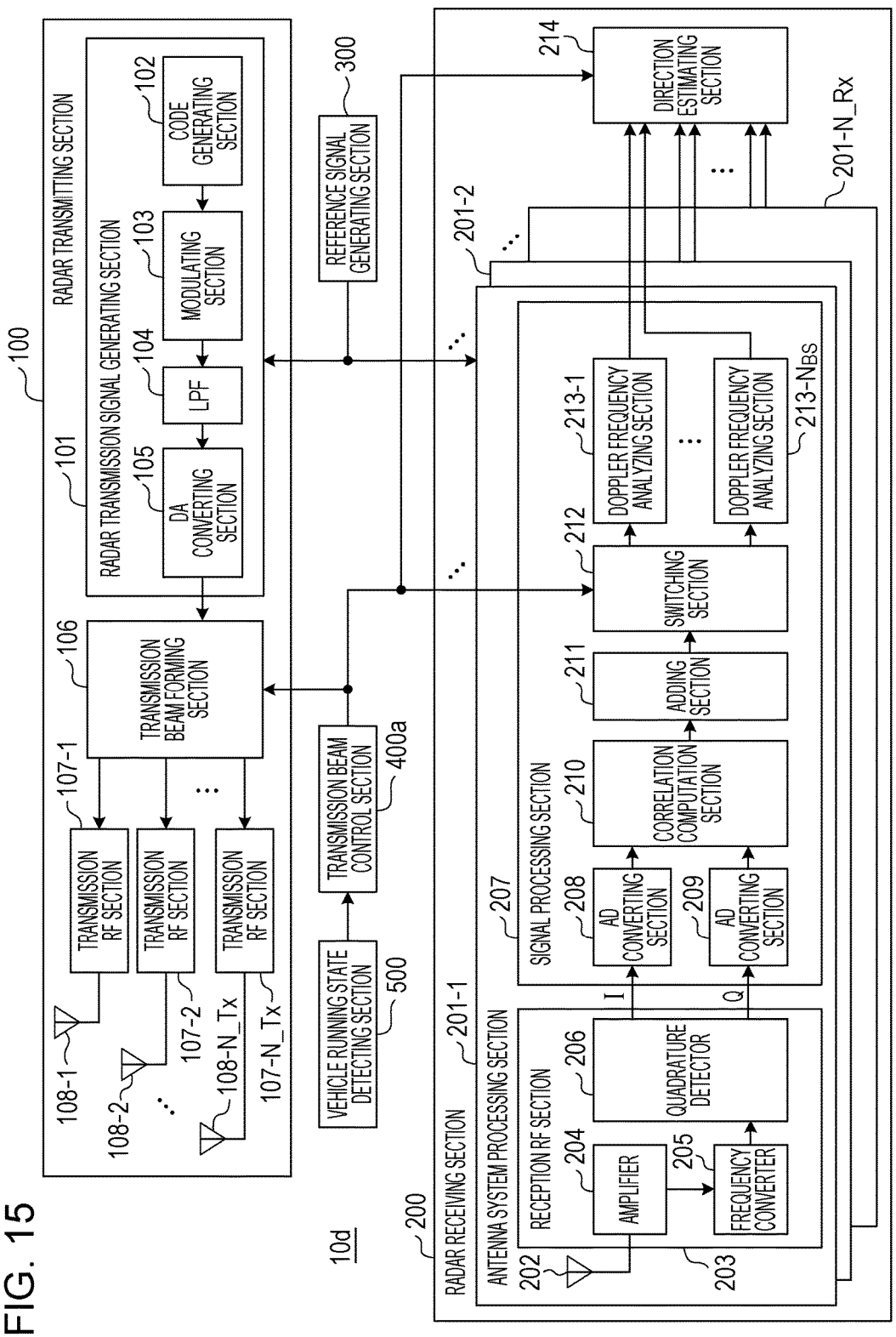
FIG. 15 is a block diagram illustrating a configuration of a radar device according to Modification 4 of one embodiment of the present disclosure.

FIG. 15 is a block diagram illustrating a configuration of a radar device 10d according to Modification 4. The radar device 10d is different from the radar device 10 illustrated in FIG. 3 in that the radar device 10d additionally includes a vehicle running state detecting section 500 and a transmission beam control section 400a operates on the basis of an output from the vehicle running state detecting section 500.

The vehicle running state detecting section 500 detects the speed of the vehicle, for example, on the basis of sensor information received from a vehicle speed sensor (not illustrated) of the vehicle in which the radar device 10d is mounted and then supplies the detection result to the transmission beam control section 400a.

The transmission beam control section 400a performs a transmission beam control operation on the basis of the detection result received from the vehicle running state detecting section 500. Specifically, the transmission beam control section 400a may set the transmission beam set beam number $N_{BS}$ in accordance with the vehicle speed. For example, the transmission beam control section 400a may cause the transmission beam set beam number $N_{BS}$ in a case where the vehicle speed is equal to or lower than a predetermined speed $L_{speed}$ to be larger than that in a case where the vehicle speed exceeds the predetermined speed $L_{speed}$. For example, assume that $L_{speed}$ is 40 km/h, the transmission beam control section 400a may set the transmission beam set beam number $N_{BS}$ to 2 in a case where the vehicle running speed exceeds 40 km/h and set the transmission beam set beam number $N_{BS}$ to 3 in a case where the vehicle running speed is equal to or lower than 40 km/h.

The transmission beam control section 400a may increase a first switching period T1 (=Tr×Np) in a case where the vehicle speed is equal to or lower than the predetermined speed $L_{speed}$.

A second switching period T2 is expressed by (Tr×Np×$N_{BS}$×NC). In a case where the vehicle running speed is equal to or lower than the predetermined speed $L_{speed}$, the transmission beam set beam number $N_{BS}$ becomes larger, and therefore the second switching period T2 becomes longer. Accordingly, a sampling interval becomes longer in Doppler frequency analyzing processing in a Doppler frequency analyzing section 213. This makes a Doppler frequency observation period longer. As a result, Doppler frequency resolution improves.

Meanwhile, in a case where the vehicle speed is equal to or lower than the predetermined speed $L_{speed}$, an observable maximum Doppler frequency fd_max becomes lower. However, in a situation in which the vehicle running speed is equal to or lower than the predetermined speed, an assumed maximum Doppler frequency is lower, and therefore it is possible to prevent erroneous detection of a Doppler frequency even in a case where the observable maximum Doppler frequency fd_max is lower.

As described above, in Modification 4, the transmission beam control section 400a controls the transmission beam set beam number $N_{BS}$ on the basis of the running state of the vehicle in which the radar device 10d is mounted. Specifically, in a case where the vehicle running speed is equal to or lower than a predetermined speed, an assumed maximum Doppler frequency is lower, and therefore processing in which resolution of a Doppler frequency component is improved can be performed in the Doppler frequency analyzing section 213. Therefore, according to the radar device 10d, it is possible to improve the performance of detection of an object that moves at a low speed such as a pedestrian. Furthermore, it is possible to improve the performance of detection of an object that moves in a cross-range direction that is orthogonal to a distance-range direction of the radar device 10d.

Note that in a case where the radar device 10d is mounted on the front side of the vehicle, the transmission beam control section 400a may perform the following processing in accordance with the detection result of the vehicle running state detecting section 500.

Figure 16:
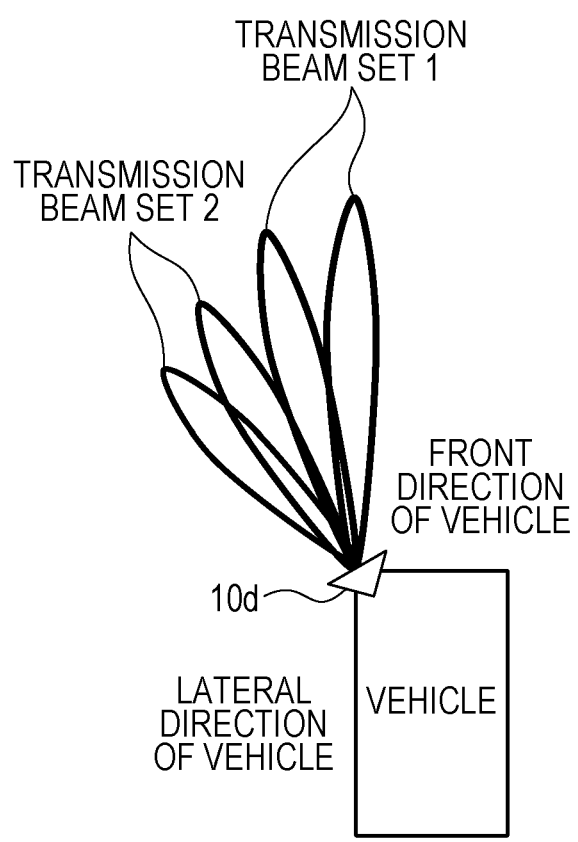
FIG. 16 is a diagram illustrating an example of transmission beam sets in an on-board radar device according to Modification 4 of one embodiment of the present disclosure.

Specifically, on the basis of an output of the vehicle running state detecting section 500, the transmission beam control section 400a makes the number of used transmission beam sets smaller and makes the first switching period T1 longer in a case where the vehicle speed exceeds the predetermined speed $L_{speed}$ than in a case where the vehicle speed is equal to or lower than the predetermined speed $L_{speed}$. Note that the transmission beam sets include a transmission beam set 1 in which transmission beam directions are the front direction of the vehicle and a transmission beam set 2 in which transmission beam directions are the lateral direction of the vehicle as illustrated in FIG. 16.

For example, in a case where the vehicle running speed is equal to or lower than the predetermined speed $L_{speed}$ (60 km/h), the transmission beam control section 400a alternately switches between the transmission beam set 1 ($\theta_{Tx(u1)}$, $\theta_{Tx(u2)}$, . . . ) in which transmission beam directions are the front direction of the vehicle and the transmission beam set 2 ($\theta_{Tx(u3)}$, $\theta_{Tx(u4)}$ . . . ) in which transmission beam directions are the lateral direction of the vehicle.

Meanwhile, in a case where the vehicle running speed exceeds the predetermined speed $L_{speed}$ (60 km/h), the transmission beam control section 400a uses the transmission beam set 1 ($\theta_{Tx(u1)}$, $\theta_{Tx(u2)}$, . . . ). Furthermore, the transmission beam control section 400a makes the first switching period T1 longer (for example, approximately 2 times longer).

As described above, in the vehicle in which the radar device 10d is mounted on the front side of the vehicle, the transmission beam control section 400a varies the number of used transmission beam sets on the basis of the vehicle running state. Furthermore, the transmission beam control section 400a makes the first switching period T1 longer in a case where the number of transmission beam sets is reduced.

With the arrangement, in a case where the vehicle running speed exceeds a predetermined value, the first switching period T1 can be made longer by using a transmission beam set in which transmission beam directions are the front direction of the vehicle. This allows the radar device 10d to have a longer detection distance in the front direction. Therefore, the radar device 10d can check the safety in the front direction of the vehicle earlier. As a result, the radar device 10d can improve a preventive safety effect as an on-board radar.

Main examples of a traffic accident that occurs in a case where a vehicle is running on a road section with no intersection include collision with a vehicle that exists ahead, collision with a road structure, and a collision with a pedestrian crossing a road (including a pedestrian who runs into a road). In order to prevent such traffic accidents or reduce the number of traffic accidents, the radar device 19d needs to detect an object and a human existing on a driveway or a sidewalk.

Figure 17:
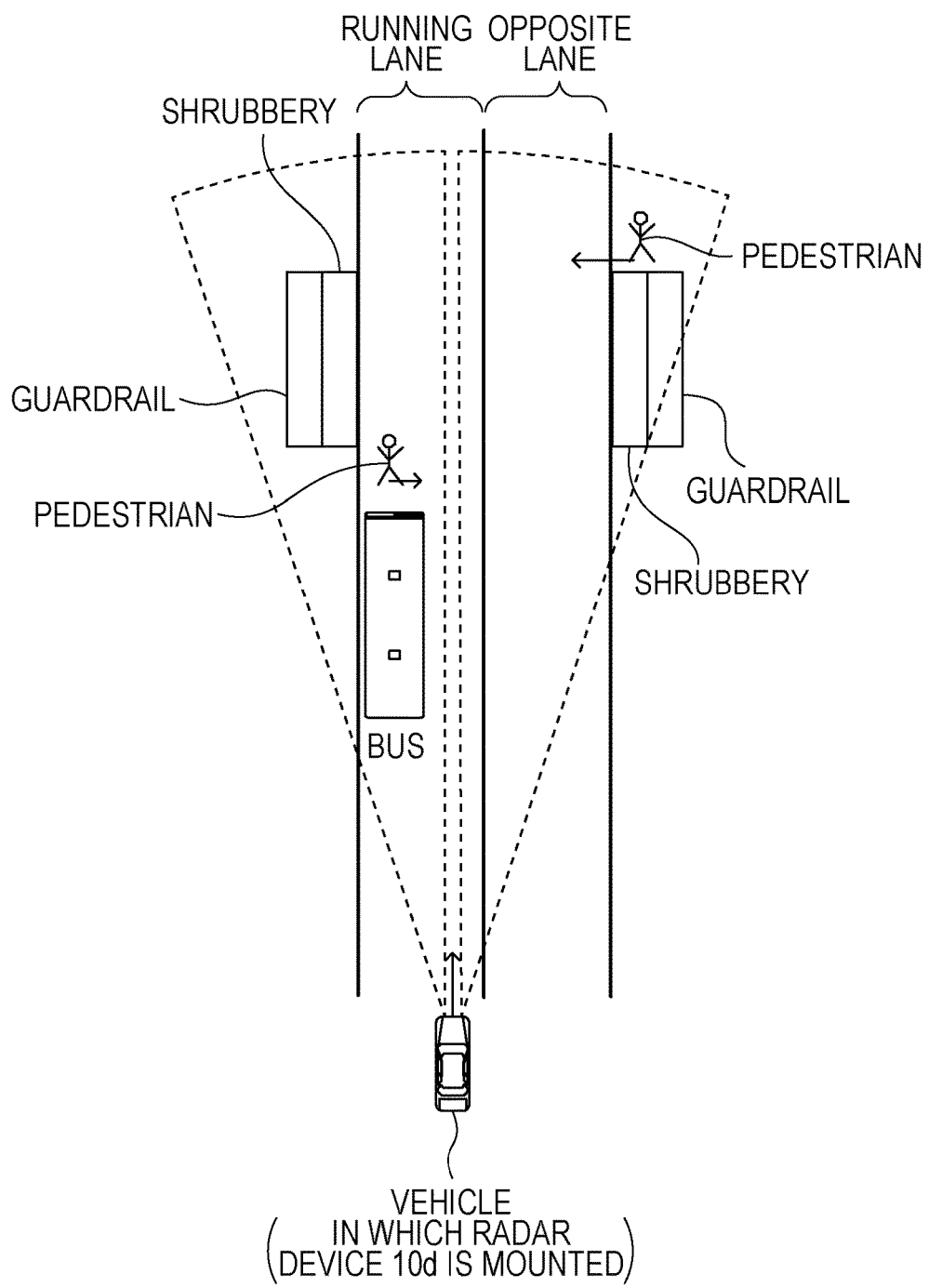
FIG. 17 is a diagram illustrating an example of detection targets and a detection range during running straight on a road section with no intersection according to Modification 4 of one embodiment of the present disclosure.

FIG. 17 illustrates an example of detection targets and a detection range in a case where the vehicle in which the radar device 10d is mounted is running straight on a road section with no intersection. Among the detection targets, a vehicle (a bus in FIG. 17), which is a representative mobile object, is present on a driveway, and a bicycle or a pedestrian is present on a sidewalk or the driveway.

In general, the speed of a vehicle running on a road section with no intersection is higher than that of a vehicle running in the vicinity of an intersection. In view of this, in order to prevent a traffic accident, the radar device 10d is required to perform detection at an earlier timing, i.e., required to perform long-range detection. For example, in order for the radar device 10d to complete detection of a target 3 seconds before a collision predicted time during running at a speed of 60 km/h, it is necessary that the radar device 10d be capable of detecting a target that is away by approximately 50 m (16.6 m/s×3 seconds).

Meanwhile, it is only necessary that an angular direction cover driveways, i.e., the lane on which the present vehicle is running and an opposite lane and sidewalks that run parallel with the driveways as illustrated in FIG. 17. Since a lane width of an ordinary street in Japan is, for example, 3.5 m, the total width of a four-lane street (two lanes each way) is approximately 15 m. Even in a case where sidewalks are included, the total width is approximately 20 m. In view of this, assume that the travelling direction of the vehicle is 0 degree, a viewing angle of approximately 30 degrees on the right and left (approximately 60 degrees in total) is sufficient as a detection range of the radar device 10d during driving on a road section with no intersection.

Figure 18:
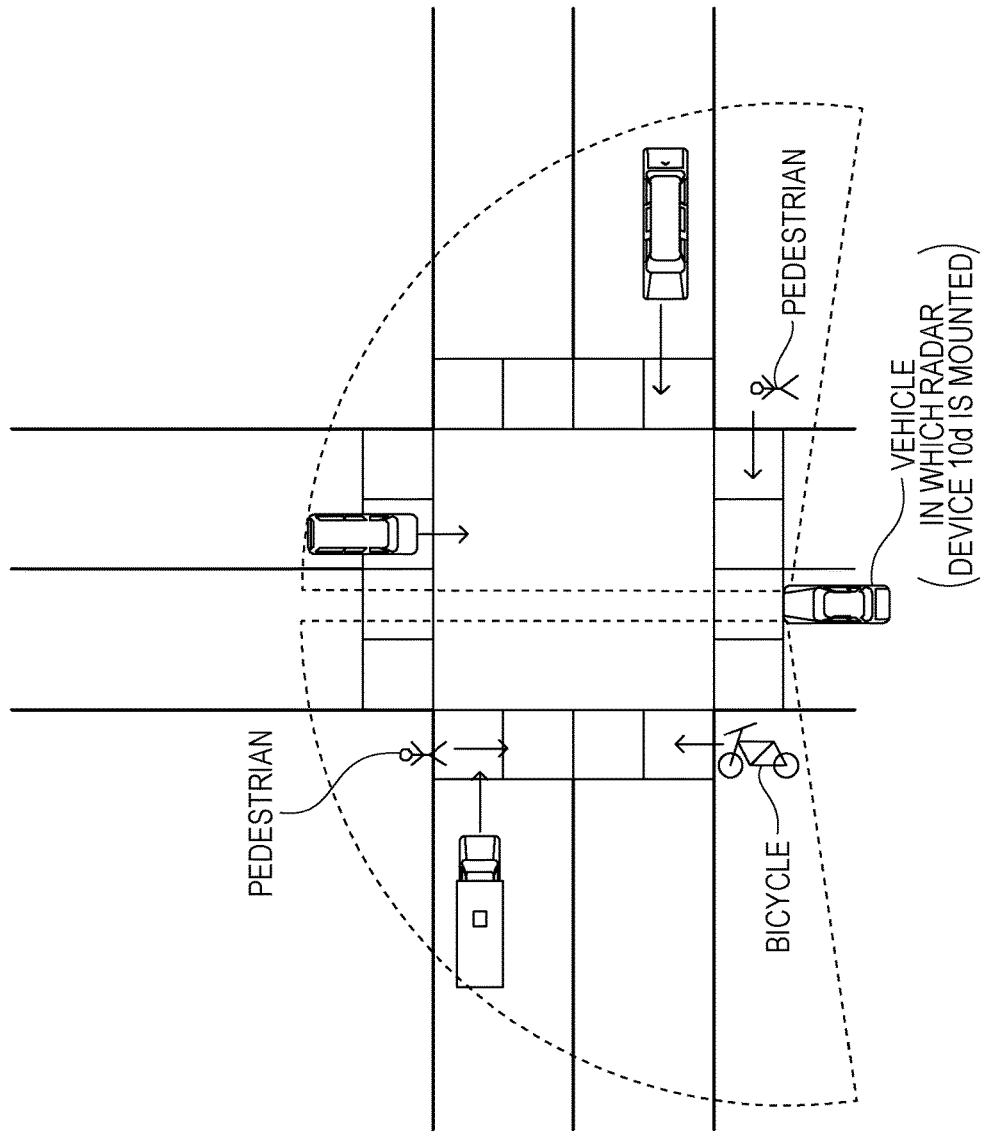
FIG. 18 is a diagram illustrating an example of detection targets and a detection range in the vicinity of an intersection according to Modification 4 of one embodiment of the present disclosure.

Meanwhile, in the vicinity of an intersection as illustrated in FIG. 18, the detection range of the radar device 10d needs to cover not only the lane on which the present vehicle is running and the opposite lane, but also a road that crosses the lane on which the present vehicle is running and a crosswalk on which a bicycle or a pedestrian is passing. Accordingly, as illustrated in FIG. 18, the radar device 10d needs to have a wider-angle detection range than that during running on a road section with no intersection (FIG. 17). However, since a vehicle is generally running at a low speed in the vicinity of an intersection, the detection distance of the radar device 10d can be shorter than that during running on a road section with no intersection (FIG. 17).

As illustrated in FIGS. 17 and 18, the radar device 10d just needs to switch the detection range between long-distance/narrow-angle, which is set during high-speed running (for example, during running on a road section with no intersection), and short-distance/wide-angle, which is set during low-speed running (for example, during entering an intersection). This allows the radar device 10d to effectively switch a detection range depending on a state of the vehicle in which the radar device 10d is mounted or a surrounding situation, thereby contributing a reduction in the number of traffic accidents and prevention of traffic accidents.

Figure 19:
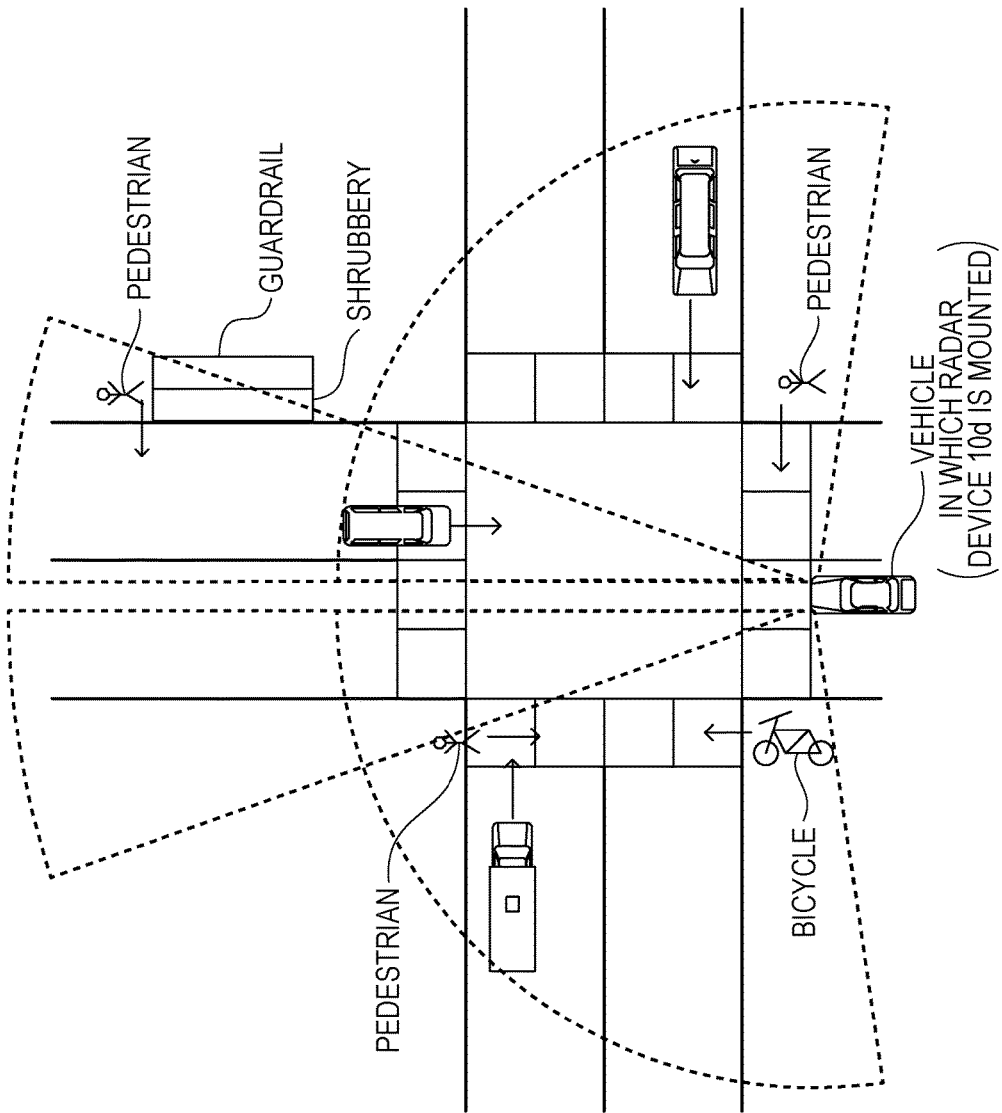
FIG. 19 is a diagram illustrating an example of a detection range that varies depending on a detection direction according to Modification 4 of one embodiment of the present disclosure.

Alternatively, as illustrated in FIG. 19, the radar device 10d may switch the detection range depending on a direction of detection. In FIG. 19, a long-distance/narrow-angle detection range is set on the front side of the vehicle in which the radar device 10d is mounted, and a short-distance/wide-angle detection range is set on the lateral side of the vehicle in which the radar device 10d is mounted.

Modification 5

In the above embodiment, a case where a pulse-compression radar is used has been described. However, in Modification 5, a radar type using a frequency-modulated pulse wave such as a chirp pulse radar is described.

Figure 20:
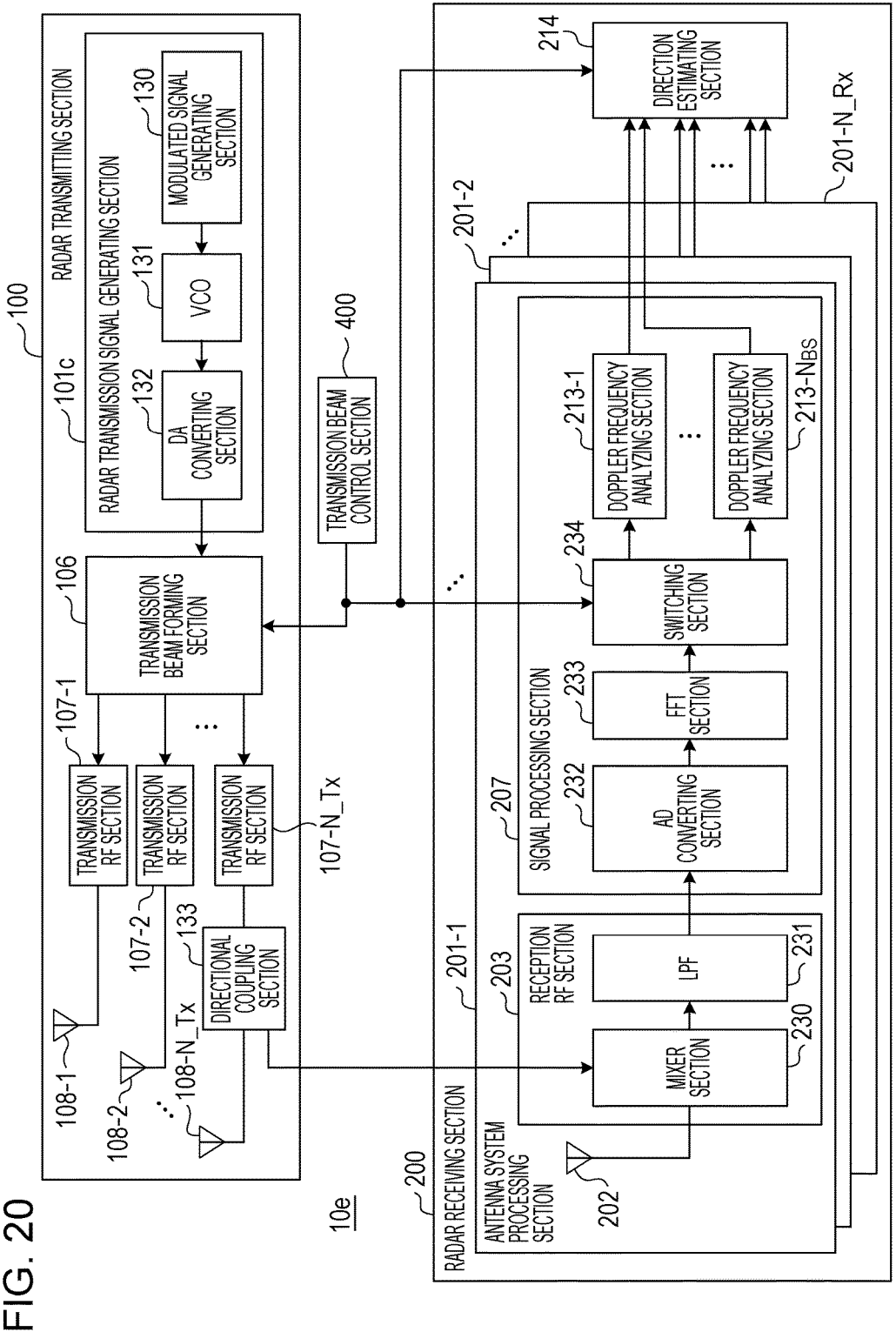
FIG. 20 is a block diagram illustrating a configuration of a radar device according to Modification 5 of one embodiment of the present disclosure.

FIG. 20 is a block diagram illustrating a configuration of a radar device 10e according to Modification 5. The radar device 10e uses a chirp pulse in a radar transmitting section 100.

Figure 21:
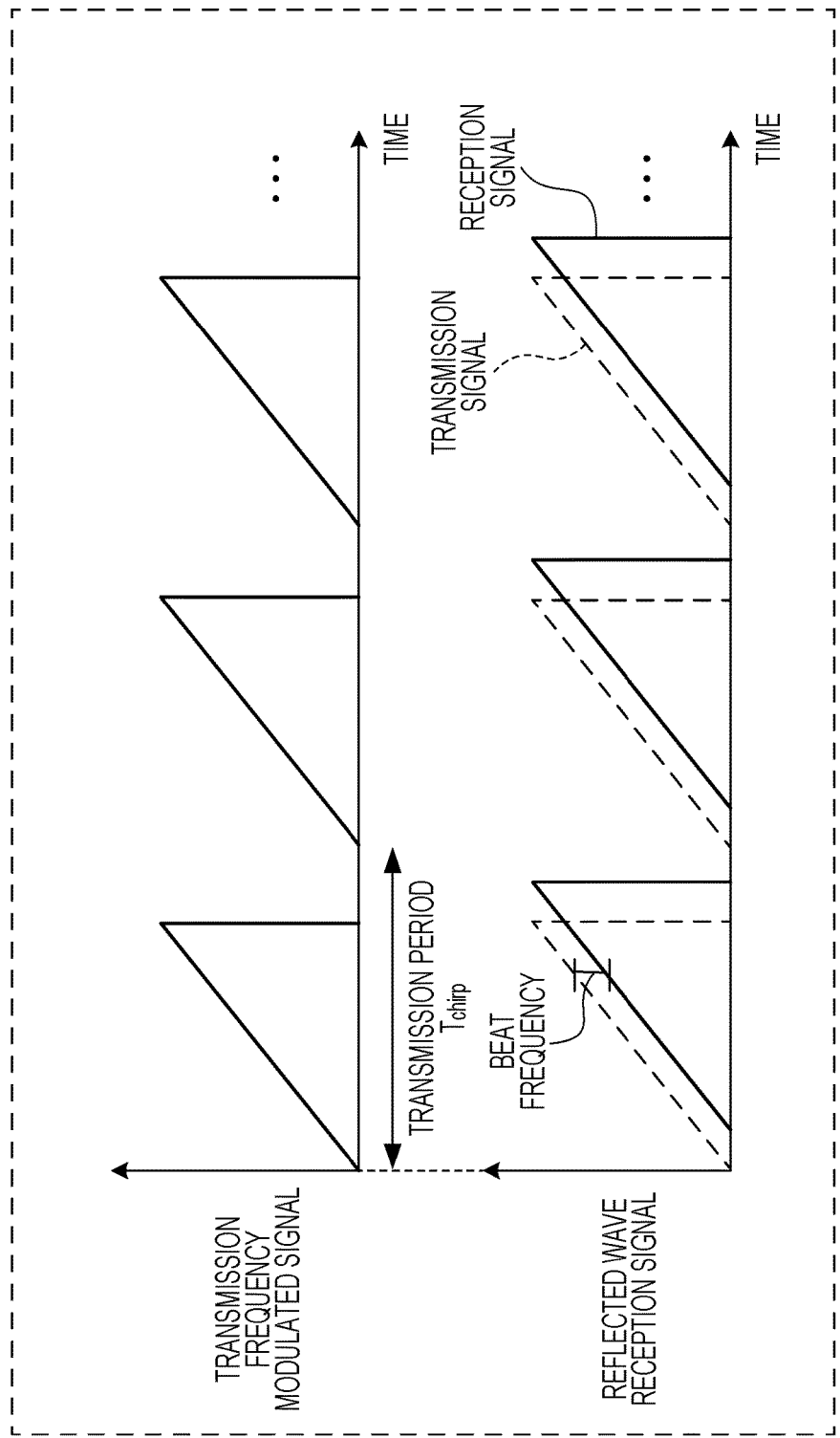
FIG. 21 is a diagram illustrating a transmission chirp pulse signal and a reflected signal.

In the radar transmitting section 100, a modulated signal generating section 130 periodically generates a sawtooth-shaped modulated signal that is frequency-modulated (see FIG. 21). In this example, a transmission period of the modulated signal is expressed by $T_{chirp}$.

A VCO (Voltage Controlled Oscillator) 131 outputs a frequency-modulated signal on the basis of a signal that is frequency-modulated by the modulated signal received from the modulated signal generating section 131.

A DA converting section 132 converts the digital transmission signal received from the VCO 131 into an analog transmission signal and supplies the analog transmission signal to a transmission beam forming section 106.

A radar transmission signal generating section 101c variably controls the transmission period $T_{chirp}$ to match a first switching period T1 on the basis of the first switching period T1 instructed by a transmission beam control section 400.

A directional coupling section 133 supplies some of signals radiated from a plurality of transmission antennas 108 to a mixer section 230 of a radar receiving section 200. The other signals are radiated as radio waves from the transmission antennas 108 into a space.

In the radar receiving section 200, the mixer section 230 mixes the transmission signal received from the directional coupling section 133 with a reflected radar transmission signal.

The LPF 231 extracts a beat signal having a frequency (beat frequency) according to a delay period of the reflected signal by allowing passage of a signal component in a predetermined restricted band or lower among signal components of the mixed reception signal. For example, as illustrated in FIG. 21, a beat signal having a beat frequency is obtained from the reflected signal (reception signal).

In a signal processing section 207, an AD converting section 232 performs AD conversion of the beat signal into digital data.

An FFT section 233 obtains a frequency spectrum (beat frequency spectrum response) in which a peak of a beat frequency appears in accordance with the delay period of the reflected signal by performing FFT processing with respect to ($N_{data}$) sample data per transmission period $T_{chirp}$. In this example, beat frequency spectrum response obtained in an m-th chirp pulse transmission period is expressed by Cl_chirp (fb, m) where fb is a bin number of FFT, and fb=1, ..., $N_{data}/2$.

A switching section 234 selectively switches an output of the FFT section 233 as an input to as many Doppler frequency analyzing sections 213 as the transmission beam set beam number $N_{BS}$ in accordance with a control signal from the transmission beam control section 400.

For example, in a case where the transmission beam set beam number $N_{BS}$ is 2, two Doppler frequency analyzing sections 213 are provided. A Doppler frequency analyzing section 213-1 receives a (2m−1)th output Cl_chirp(fb, 2m−1) of the FFT section 233, and a Doppler frequency analyzing section 213-2 receives a (2m)th output Cl_chirp (fb, 2m) of the FFT section 233.

In a case where the transmission beam set beam number is $N_{BS}$, the signal processing section 207 includes $N_{BS}$ Doppler frequency analyzing sections 213. For example, a y-th Doppler frequency analyzing section 213-y receives a $\{N_{BS}(m-1)+y\}$th output Cl_chirp(fb, $N_{BS}(m-1)+y$) of the FFT section 233 where y=1, ..., $N_{BS}$, and fb=1, ..., $N_{data}/2$.

The following describes operation in the y-th Doppler frequency analyzing section 213-y assuming that the transmission beam set beam number is $N_{BS}$. Note that y=1, ..., $N_{BS}$.

The Doppler frequency analyzing section 213-y performs coherent integration while uniforming beat frequencies fb by using, as a single unit, Cl_chirp (fb, $N_{BS}Nc(w-1)+y$) to Cl_chirp (fb, $N_{BS}(Nc\times w-1)+y$) that are Nc outputs of the FFT section 223 obtained for the respective beat frequencies fb. For example, the Doppler frequency analyzing section 213-y performs coherent integration after correcting a phase fluctuation $\Phi(fs)=2\pi fs$ (Tchirp$\times N_{BS}$)$\Delta\Phi$ according to 2Nf different Doppler frequencies $fs\Delta\Phi$ as shown by the following expression:

$$FT\_Cl_{y,Nant}(fb, f_s, w) = \sum_{q=0}^{N_c-1} Cl\_chirp(fb, N_{BS}(N_c(w-1)+q)+y)$$

-continued
$$\exp[-j\phi(f_s)q]$$

$$= \sum_{q=0}^{N_c-1} Cl\_chirp(fb, N_{BS}(N_c(w-1)+q)+y)$$

$$\exp[-j2\pi f_s(T_{chirp}N_{BS}q)\Delta\phi]$$

In the above expression, $FT\_Cl_{y,Nant}(fb, fs, w)$ is a w-th output of the Doppler frequency analyzing section 213-y and is a coherent integration result of the Doppler frequencies $fs\Delta\Phi$ at the beat frequency fb in a Nant-th antenna system processing sections 201. Note that Nant=1 to N_Rx, fs=−Nf+1, ..., 0, ..., Nf, fb=1, ..., $N_{data}/2$, w is an integer of 1 or more, and $\Delta\Phi$ is a phase rotation unit.

This allows each of the antenna system processing sections 201 to obtain, in respective plural ($N_{BS}\times Nc$) radar transmission periods $T_{chirp}$ ($T_{chirp}\times N_{BS}\times Nc$), $FT\_Cl_{y,Nant}$ (fb, −Nf+1, w), ..., $FT\_Cl_{y,Nant}$(fb, Nf−1, w) that are results of coherent integration according to 2Nf Doppler frequency components for the respective beat frequencies fb. Note that j is an imaginary unit.

With the above arrangement and operation, even in a case where a frequency-modulated pulse wave such as a chirp pulse radar is used, it is possible to maintain Doppler frequency resolution and to shorten a beam scanning period as in the above embodiment.

The embodiment according to one aspect of the present disclosure has been descried above.

Note that operations in the above embodiment and the modifications may be combined as appropriate.

In the radar device 10 illustrated in FIG. 3, the radar transmitting section 100 and the radar receiving section 200 may be individually disposed in physically separate places.

The radar device 10 includes, for example, a CPU (Central Processing Unit), a storage medium such as a ROM (Read Only Memory) in which controls programs are stored, and a working memory such as a RAM (Random Access Memory). In this case, the functions of the above sections are realized by CPU's execution of the control programs. However, the hardware configuration of the radar device 10 is not limited to this example. For example, each functional section of the radar device 10 may be realized as an IC (Integrated Circuit). The functional sections may be realized by individual chips or some or all of the functional sections may be realized by a single chip.

Furthermore, a method for realizing the integrated circuit is not limited to LSI, but the integrated circuit may be realized by a dedicated circuit or a general-purpose processor. An FPGA (Field Programmable Gate Array) that can be programmed after production of an LSI or a reconfigurable processor in which connection and settings of a circuit cell in the LSI can be reconfigured may be used.

Furthermore, if other techniques for achieving an integrated circuit that take the place of LSI appear as a result of the progress or derivation of the semiconductor technique, it is of course possible to realize integration of the functional blocks by using such other techniques. One possibility is application of a biotechnology etc.

SUMMARY OF PRESENT DISCLOSURE

A radar device of the present disclosure includes: a transmission beam controller that selects, every first period, a transmission beam set used for transmission of a radar signal from among a plurality of transmission beam sets each including at least two transmission beams having different directions; and a radar transmitter that transmits the radar signal in a predetermined transmission period by using the selected transmission beam set, wherein the transmission beam controller switches, every second period within the first period, among the at least two transmission beam having different directions included in the selected transmission beam set.

The radar device of the present disclosure further includes: a receiver that receives a reflected signal which is the radar signal reflected by a target; a coherent integration processor that performs, every second period, coherent integration with respect to the received reflected signal; and a Doppler frequency analyzer that performs Doppler frequency analysis with respect to the coherent integration result.

In the radar device of the present disclosure, a length of the second period has a variable length.

In the radar device of the present disclosure, the length of the second period varies depending on a directivity gain of a corresponding one of the transmission beams; and the second period has a longest length for a transmission beam in which the directivity gain is lowest out of the at least two transmission beams having different directions.

In the radar device of the present disclosure, in a case where the radar device is mounted in a vehicle, the length of the second period is longer for a transmission beam corresponding to a front direction of the vehicle than for a transmission beam corresponding to a lateral direction of the vehicle out of the at least two transmission beams having different directions.

In the radar device of the present disclosure, in a case where the radar device is mounted in a vehicle, the transmission beam controller adjusts number of the transmission beams included in each of the plurality of transmission beam sets in accordance with speed of the vehicle; and the number of the transmission beams in a case where the speed of the vehicle is equal to or lower than a predetermined threshold value is larger than that in a case where the speed of the vehicle exceeds the predetermined threshold value.

In the radar device of the present disclosure, in a case where the radar device is mounted in a vehicle, the transmission beam controller adjusts the number of the transmission beams included in each of the plurality of transmission beam sets and a length of the second period in accordance with speed of the vehicle; the number of the transmission beams in a case where the speed of the vehicle exceeds a predetermined threshold value is smaller than that in a case where the speed of the vehicle is equal to or lower than the predetermined threshold value; and the length of the second period in the case where the speed of the vehicle exceeds the predetermined threshold value is longer than in the case where the speed of the vehicle is equal to or lower than the predetermined threshold value.

In the radar device of the present disclosure, a length of the second period is equal to a multiplication result of the predetermined transmission period and an additional amount of the reflected signal in the coherent integration processor; and a length of the first period is equal to a multiplication result of the second period, the number of the transmission beams included in transmission beam set in the second period, and an additional amount of the coherent integration result in the Doppler frequency analyzer.

The radar device of the present disclosure which makes it possible to suppress a degradation of resolution in relative speed detection based on Doppler frequency detection and to shorten a scanning period is suitable for a radar device that detects a wide-angle range by scanning a transmission beam.

What is claimed is:

1. A radar device comprising:
   a transmission beam controller, which, in operation, selects a transmission beam set used for transmission of a radar signal from among a plurality of transmission beam sets, each of the plurality of transmission beam sets including at least two transmission beams having different directions, the transmission beams of the plurality of transmission beam sets having different directions from each other, the transmission beam controller, in operation, switches the at least two transmission beams included in the selected transmission beam set; and
   a radar transmitter, which, in operation, transmits the radar signal in a predetermined transmission period by using at least one of the at least two transmission beams included in the selected transmission beam set, wherein
   the transmission beam controller, in operation, switches, in each of multiple first periods, the selected transmission beam set from one of the plurality of transmission beam sets to another of the plurality of transmission beam sets,
   the transmission beam controller, in operation, switches, in each of multiple second periods within each of the multiple first periods, from a transmission beam from one of the at least two transmission beams included in the selected transmission beam set to another of the at least two transmission beams included in the selected transmission beam set, and
   each of the transmission beams included in the selected transmission beam set within each of the multiple first periods is transmitted in at least two of the multiple second periods within each of the multiple first periods.

2. The radar device according to claim 1, further comprising:
   a receiver, which, in operation, receives a reflected signal which is the radar signal reflected by a target;
   a coherent integration processor, which, in operation, performs, in each of the multiple second periods, coherent integration with respect to the received reflected signal; and
   a Doppler frequency analyzer, which, in operation, performs Doppler frequency analysis with respect to a coherent integration result.

3. The radar device according to claim 2, wherein
   a length of each of the multiple second periods is equal to a multiplication result of the predetermined transmission period and an additional amount of the reflected signal in the coherent integration processor; and
   a length of each of the multiple first periods is equal to a multiplication result of one of the multiple second periods, a number of the transmission beams included in transmission beam set in the one of the multiple second periods, and an additional amount of the coherent integration result in the Doppler frequency analyzer.

4. The radar device according to claim 1, wherein
   a length of each of the multiple second periods has a variable length.

5. The radar device according to claim 4, wherein
   the length of each of the multiple second periods varies depending on a directivity gain of a corresponding one of the transmission beams; and
   a second period of the multiple second periods that has a longest length is for a transmission beam in which the directivity gain is lowest out of the at least two transmission beams having different directions.

6. The radar device according to claim 4, wherein
in a case where the radar device is mounted in a vehicle, the length of a second period of the multiple second periods for a transmission beam corresponding to a front direction of the vehicle is longer than for a transmission beam corresponding to a lateral direction of the vehicle out of the at least two transmission beams having different directions.

7. The radar device according to claim 1, wherein
in a case where the radar device is mounted in a vehicle, the transmission beam controller adjusts a number of the transmission beams included in each of the plurality of transmission beam sets in accordance with a speed of the vehicle; and
the number of the transmission beams in a case where the speed of the vehicle is equal to or lower than a predetermined threshold value is larger than that in a case where the speed of the vehicle exceeds the predetermined threshold value.

8. The radar device according to claim 1, wherein
in a case where the radar device is mounted in a vehicle, the transmission beam controller adjusts a number of the transmission beams included in each of the plurality of transmission beam sets and a length of each of the multiple second periods in accordance with speed of the vehicle;
the number of the transmission beams in a case where the speed of the vehicle exceeds a predetermined threshold value is smaller than that in a case where the speed of the vehicle is equal to or lower than the predetermined threshold value; and
the length of each of the multiple second periods in the case where the speed of the vehicle exceeds the predetermined threshold value is longer than in the case where the speed of the vehicle is equal to or lower than the predetermined threshold value.

9. The radar device according to claim 1, wherein a length of each of the multiple first periods is integral multiple of a length of each of the multiple second periods.

10. A radar device comprising:
a transmission beam controller, which, in operation, selects a transmission beam set used for transmission of a radar signal from among a plurality of transmission beam sets, each of the plurality of transmission beam sets including at least four transmission beams having different directions, the transmission beam controller, in operation, switches the at least four transmission beams included in the selected transmission beam set; and
a radar transmitter, which, in operation, transmits the radar signal in a predetermined transmission period by using at least one of the at least four transmission beams included in the selected transmission beam set, wherein
the transmission beam controller, in operation, selects, in each of multiple first periods, the transmission beam set used for transmission of the radar signal, and switches, in each of multiple second periods within each of the multiple first periods, from a transmission beam from one of the at least four transmission beams included in the selected transmission beam set to another of the at least four transmission beams included in the selected transmission beam set,
each of the transmission beams included in the selected transmission beam set within each of the multiple first periods is transmitted in at least two of the multiple second periods within each of the multiple first periods, and
each of transmission beams selected from the at least four transmission beams in one period of the multiple first periods is different from each of transmission beams selected from the at least four transmission beams in another period of the multiple first periods.

11. The radar device according to claim 10, further comprising:
a receiver, which, in operation, receives a reflected signal which is the radar signal reflected by a target;
a coherent integration processor, which, in operation, performs, in each of the multiple second periods, coherent integration with respect to the received reflected signal; and
a Doppler frequency analyzer, which, in operation, performs Doppler frequency analysis with respect to a coherent integration result.

12. The radar device according to claim 11, wherein
a length of each of the multiple second periods is equal to a multiplication result of the predetermined transmission period and an additional amount of the reflected signal in the coherent integration processor; and
a length of each of the multiple first periods is equal to a multiplication result of one of the multiple second periods, a number of the transmission beams included in transmission beam set in the one of the multiple second periods, and an additional amount of the coherent integration result in the Doppler frequency analyzer.

13. The radar device according to claim 10, wherein
a length of each of the multiple second periods has a variable length.

14. The radar device according to claim 13, wherein
the length of each of the multiple second periods varies depending on a directivity gain of a corresponding one of the transmission beams; and
a second period of the multiple second periods that has a longest length is for a transmission beam in which the directivity gain is lowest out of the at least four transmission beams having different directions.

15. The radar device according to claim 13, wherein
in a case where the radar device is mounted in a vehicle, the length of a second period of the multiple second periods for a transmission beam corresponding to a front direction of the vehicle is longer than for a transmission beam corresponding to a lateral direction of the vehicle out of the at least four transmission beams having different directions.

16. The radar device according to claim 10, wherein
in a case where the radar device is mounted in a vehicle, the transmission beam controller adjusts a number of the transmission beams included in each of the plurality of transmission beam sets in accordance with a speed of the vehicle; and
the number of the transmission beams in a case where the speed of the vehicle is equal to or lower than a predetermined threshold value is larger than that in a case where the speed of the vehicle exceeds the predetermined threshold value.

17. The radar device according to claim 10, wherein
in a case where the radar device is mounted in a vehicle, the transmission beam controller adjusts a number of the transmission beams included in each of the plurality of transmission beam sets and a length of each of the multiple second periods in accordance with speed of the vehicle;

the number of the transmission beams in a case where the speed of the vehicle exceeds a predetermined threshold value is smaller than that in a case where the speed of the vehicle is equal to or lower than the predetermined threshold value; and the length of each of the multiple second periods in the case where the speed of the vehicle exceeds the predetermined threshold value is longer than in the case where the speed of the vehicle is equal to or lower than the predetermined threshold value.

18. The radar device according to claim 10, wherein a length of each of the multiple first periods is integral multiple of a length of each of the multiple second periods.

19. A radar device comprising:
a transmission beam controller, which, in operation, selects a transmission beam set used for transmission of a radar signal from among a plurality of transmission beam sets, each of the plurality of transmission beam sets including at least two transmission beams having different directions, the transmission beam controller, in operation, switches the at least two transmission beams included in the selected transmission beam set; and a radar transmitter, which , in operation, transmits the radar signal in a predetermined transmission period by using at least one of the at least two transmission beams included in the selected transmission beam set, wherein the transmission beam controller, in operation, selects, every first period, the transmission beam set used for transmission of the radar signal, and switches, every second period within the first period, from a transmission beam from one of the at least two transmission beams included in the selected transmission beam set to another of the at least two transmission beams included in the selected transmission beam set, the length of the second period varies depending on a directivity gain of a corresponding one of the transmission beams, and the second period has a longest length for a transmission beam in which the directivity gain is lowest out of the at least two transmission beams having different directions.

20. A radar device comprising:
a transmission beam controller, which, in operation, selects a transmission beam set used for transmission of a radar signal from among a plurality of transmission beam sets, each of the plurality of transmission beam sets including at least two transmission beams having different directions, the transmission beam controller, in operation, switches the at least two transmission beams included in the selected transmission beam set; and a radar transmitter, which, in operation, transmits the radar signal in a predetermined transmission period by using at least one of the at least two transmission beams included in the selected transmission beam set, wherein in a case where the radar device is mounted in a vehicle, the transmission beam controller adjusts a number of the transmission beams included in each of the plurality of transmission beam sets in accordance with a speed of the vehicle, and the number of the transmission beams in a case where the speed of the vehicle is equal to or lower than a predetermined threshold value is larger than that in a case where the speed of the vehicle exceeds the predetermined threshold value.

* * * * *